United States Patent
Uemura et al.

(10) Patent No.: US 9,959,821 B2
(45) Date of Patent: May 1, 2018

(54) LIQUID CRYSTAL DISPLAY DEVICE AND METHOD FOR DRIVING SAME

(71) Applicant: Sharp Kabushiki Kaisha, Osaka-shi, Osaka (JP)

(72) Inventors: Kentaroh Uemura, Osaka (JP); Norio Ohmura, Osaka (JP); Tatsuhiko Suyama, Osaka (JP); Noriyuki Tanaka, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 47 days.

(21) Appl. No.: 15/102,292

(22) PCT Filed: Sep. 1, 2014

(86) PCT No.: PCT/JP2014/072914
§ 371 (c)(1),
(2) Date: Jun. 7, 2016

(87) PCT Pub. No.: WO2015/087587
PCT Pub. Date: Jun. 18, 2015

(65) Prior Publication Data
US 2016/0365049 A1  Dec. 15, 2016

(30) Foreign Application Priority Data
Dec. 11, 2013 (JP) ................ 2013-256412

(51) Int. Cl.
*G06F 3/038* (2013.01)
*G09G 3/36* (2006.01)
(Continued)

(52) U.S. Cl.
CPC ......... *G09G 3/3614* (2013.01); *G02F 1/1368* (2013.01); *G02F 1/136286* (2013.01);
(Continued)

(58) Field of Classification Search
CPC .............. G09G 3/3614; G09G 3/3668; G09G 2300/0426; G09G 2310/0286;
(Continued)

(56) References Cited

U.S. PATENT DOCUMENTS

2002/0180673 A1  12/2002 Tsuda et al.
2006/0022929 A1   2/2006 Hashimoto et al.
(Continued)

FOREIGN PATENT DOCUMENTS

JP  2001-312253 A  11/2001
JP  2006-039337 A   2/2006
(Continued)

OTHER PUBLICATIONS

Official Communication issued in International Patent Application No. PCT/JP2014/072914, dated Dec. 2, 2014.

*Primary Examiner* — Mark Regn
(74) *Attorney, Agent, or Firm* — Keating & Bennett, LLP

(57) ABSTRACT

In a liquid crystal display device, a drive unit is controlled in a direction of eliminating a polarity bias of a data voltage corresponding to image data at a point of time when a refresh signal for updating an image displayed on a display unit by periodical refreshment or forced refreshment is generated, and the polarity bias is obtained for each of subsequent frame periods. In this manner, not only the polarity bias after the point of time when the refresh signal is generated is obtained so that the polarity bias at the point of time when the refresh signal is generated is eliminated, but also the polarity bias is repeatedly obtained in the same way every time the refresh signal is generated, and accordingly, the polarity bias can be prevented from being increased.

11 Claims, 11 Drawing Sheets

(51) Int. Cl.
*G02F 1/1362* (2006.01)
*G02F 1/1368* (2006.01)
*G02F 1/1343* (2006.01)

(52) U.S. Cl.
CPC ......... *G09G 3/3648* (2013.01); *G09G 3/3677* (2013.01); *G09G 3/3696* (2013.01); *G02F 1/134309* (2013.01); *G02F 2201/121* (2013.01); *G02F 2201/123* (2013.01); *G09G 3/3688* (2013.01); *G09G 2300/0426* (2013.01); *G09G 2310/0286* (2013.01); *G09G 2310/0291* (2013.01); *G09G 2310/065* (2013.01); *G09G 2310/08* (2013.01); *G09G 2320/0247* (2013.01); *G09G 2320/0673* (2013.01); *G09G 2330/021* (2013.01)

(58) Field of Classification Search
CPC ..... G09G 2310/0291; G09G 2310/065; G09G 2320/0247; G09G 2320/0676; G09G 3/3648; G09G 3/3677; G09G 3/3696; G02F 1/134309; G02F 2202/121; G02F 2202/123; G08G 2330/021

USPC ....................................................... 345/209
See application file for complete search history.

(56) References Cited

U.S. PATENT DOCUMENTS

| | | | |
|---|---|---|---|
| 2011/0285759 A1* | 11/2011 | Sakai | G09G 3/3648 345/690 |
| 2013/0056729 A1* | 3/2013 | Misaki | H01L 27/1225 257/43 |
| 2014/0368484 A1 | 12/2014 | Tanaka et al. | |
| 2014/0368492 A1 | 12/2014 | Fujioka et al. | |
| 2015/0002381 A1* | 1/2015 | Fujioka | G09G 3/3614 345/87 |

FOREIGN PATENT DOCUMENTS

| | | |
|---|---|---|
| WO | 2010/106713 A1 | 9/2010 |
| WO | 2013/115088 A1 | 8/2013 |
| WO | 2013/125405 A1 | 8/2013 |
| WO | 2013/125406 A1 | 8/2013 |

* cited by examiner

Fig. 9
(A)
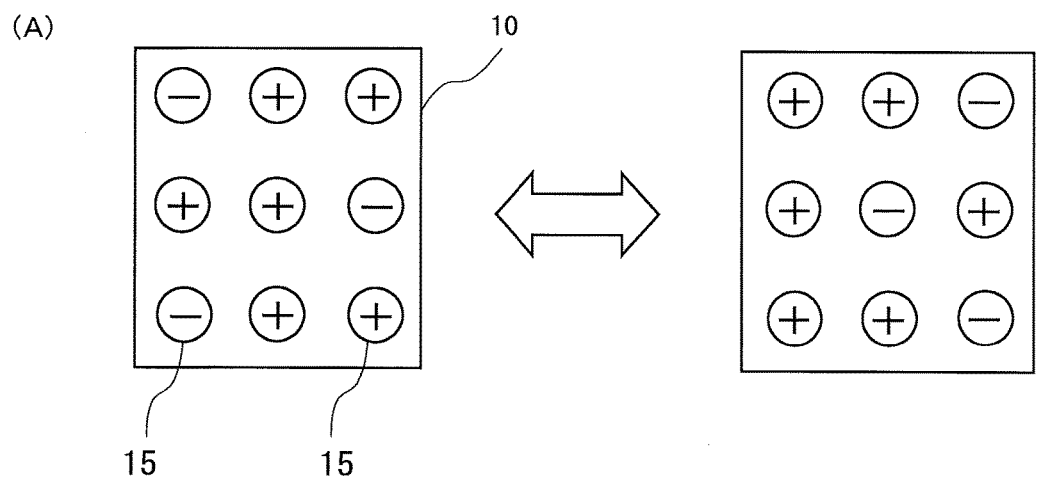
(B)
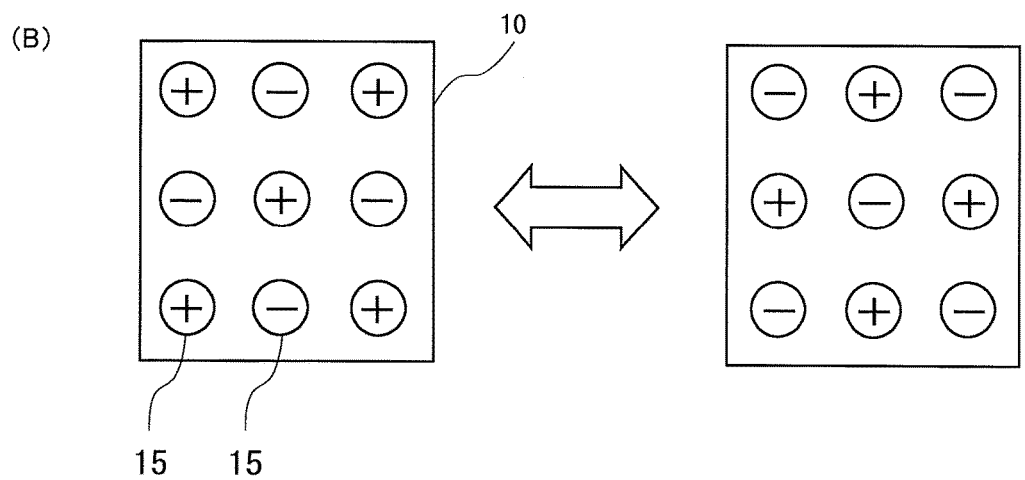

LIQUID CRYSTAL DISPLAY DEVICE AND METHOD FOR DRIVING SAME

TECHNICAL FIELD

The present invention relates to a liquid crystal display device and a method for driving the same, and particularly, relates to a liquid crystal display device that suppresses occurrence of a flicker and an afterimage, and to a method for driving the same.

BACKGROUND ART

On a display unit of an active matrix-type liquid crystal display device, a plurality of pixel formation portions are formed in a matrix. In each of the pixel formation portions, there are provided: a thin film transistor (hereinafter, referred to as a "TFT") that operates as a switching element; and a pixel capacitance connected to a data signal line through the TFT. By switching on/off this TFT, a voltage of image data for displaying an image is written as a data voltage into the pixel capacitance in the pixel formation portion. This data voltage is applied to a liquid crystal layer of the pixel formation portion, and changes an orientation direction of liquid crystal molecules to a direction corresponding to a data voltage value. As described above, the liquid crystal display device controls a transmittance of the liquid crystal layer of each pixel formation portion, and displays an image on the display unit.

In a case of using the above-described liquid crystal display device as a display of a portable electronic device, it is required to reduce electric power consumption thereof. Accordingly, in a case where it is desired to display only a still image, the liquid crystal display device is operated by a pause drive, and in a case where it is desired to display a moving picture and a still image in a switching manner, the liquid crystal display device is operated by a high frequency drive for displaying the moving picture and by the pause drive for displaying the still image in a switching manner. Here, for example, as described in Japanese Patent Application Laid-Open No. 2001-312253, the pause drive is a drive method of pausing refreshment by turning all of scanning signal lines to a non-scanning state after a scanning period (also referred to as a "refresh period") of performing the refreshment of the display image by scanning the scanning signal lines. As described above, the liquid crystal display device pauses an operation of a scanning signal line drive circuit and/or a data signal line drive circuit in a pause period by performing the pause drive, and can reduce the electric power consumption.

PRIOR ART DOCUMENT

Patent Document

[Patent Document 1] Japanese Patent Application Laid-Open No. 2001-312253

SUMMARY OF THE INVENTION

Problems to be Solved by the Invention

However, when the pause drive is performed in the liquid crystal display device, a polarity bias (charge bias) is stored during the pause period, and because of the polarity bias, impurity ions included in a liquid crystal layer are unevenly distributed. A direct current voltage component generated by the impurity ions thus unevenly distributed affects the orientation direction of the liquid crystal molecules, which should be changed in a direction corresponding to the data voltage value. In this manner, during the operation of the liquid crystal display device, there occurs a display defect such as occurrence of a flicker due to deviation of an optimum common voltage and occurrence of an afterimage due to burn-in of liquid crystal.

In this connection, it is an object of the present invention to provide a liquid crystal display device, in which the display defect caused by the polarity bias stored at the time of the pause drive is unlikely to occur, and to provide a method for driving the same.

Means for Solving the Problems

A first aspect of the present invention is directed to a liquid crystal display device that displays an image represented by inputted image data on a display unit by applying a data voltage corresponding to the image data to a liquid crystal layer of the display unit, the liquid crystal display device including:

a drive unit configured to apply the data voltage to the liquid crystal layer; and a display control unit configured to manage a polarity bias of the data voltage in a predetermined period unit, and to control the drive unit in a direction in which the polarity bias of the data voltage is eliminated in a frame period for updating the image displayed on the display unit.

According to a second aspect of the present invention, in the first aspect of the present invention, wherein the display unit includes a plurality of pixel formation portions configured to hold the data voltage; and in order to eliminate the polarity bias in the frame period for updating the image, the display control unit specifies a direction in which a polarity bias value representing the polarity bias is changed, and controls the drive unit to apply the data voltage to each of the plurality of pixel formation portions, the data voltage having the polarity bias value changed in the specified direction for each of the frame period for updating the image and of frame periods subsequent to the frame period.

According to a third aspect of the present invention, in the second aspect of the present invention, wherein the display control unit includes:

a polarity bias management circuit configured to obtain and manage the polarity bias value in the predetermined period unit;

a polarity reverse control circuit configured to generate a polarity signal that controls the polarity bias value in a direction in which the polarity bias value approaches "0" in a case where the polarity bias value outputted from the polarity bias management circuit is not "0" in the frame period for updating the image, and controls the polarity bias value in a direction in which the polarity bias value is reversed in a case where the polarity bias value is "0" in the frame period; and a timing control circuit configured to generate, at predetermined timing, a refresh signal indicating that the frame period is the frame period for updating the image, and to give the generated refresh signal to the polarity bias management circuit and the polarity reverse control circuit; and an NREF counter configured to count a number of pause frame periods, and the polarity bias management circuit increases or decreases the polarity bias value by "1" in the direction specified by the polarity signal given from the polarity reverse control circuit.

According to a fourth aspect of the present invention, in the third aspect of the present invention, wherein the polarity bias management circuit includes a balance counter configured to count and hold the polarity bias value, and every time a vertical synchronizing signal used for displaying the image represented by the image data on the display unit is given, the polarity bias management circuit increases or decreases the polarity bias value held in the balance counter by "1" in the direction specified by the polarity signal.

According to a fifth aspect of the present invention, in the third aspect of the present invention, wherein the timing control circuit generates and outputs the refresh signal when a count value of the NREF counter reaches a predetermined number.

According to a sixth aspect of the present invention, in the third aspect of the present invention, wherein a forced refresh signal for displaying a new image on the display unit is given to the display control unit together with image data for displaying the new image, the timing control circuit generates and outputs the refresh signal based on the forced refresh signal.

According to a seventh aspect of the present invention, in the third aspect of the present invention, wherein, when a command to horizontally or vertically reverse the image displayed on the display unit is given, the timing control circuit generates and outputs the refresh signal based on the command.

According to an eighth aspect of the present invention, in the third aspect of the present invention, wherein when a high frequency synchronizing signal generated in synchronization with a cycle of a high frequency drive is given in a case where the liquid crystal display device shifts from a pause drive to a high frequency drive, the timing control circuit generates the refresh signal based on the high frequency synchronizing signal and outputs the generated refresh signal to the polarity bias management circuit and the polarity reverse control circuit, and every time the high frequency synchronizing signal is given, the polarity bias management circuit increases or decreases the polarity bias value by "1" in the direction specified by the polarity signal.

According to a ninth aspect of the present invention, in any one of the fifth to eighth aspects of the present invention, wherein the timing control circuit resets the NREF counter in a case of generating and outputting the refresh signal.

According to a tenth aspect of the present invention, in the third aspect of the present invention, further including:

a positive gamma circuit configured to generate positive data voltage based on the image data and a negative gamma circuit configured to generate negative data voltage based on the image data, wherein the display control unit further includes a selector configured to select one of the positive gamma circuit and the negative gamma circuit based on the polarity signal, and the selector selects one of the positive gamma circuit and the negative gamma circuit and gives the image data based on the polarity signal given from the polarity reverse control circuit.

According to an eleventh aspect of the present invention, in the third aspect of the present invention, further including:

a frame memory configured to store the inputted image data, wherein the timing control circuit gives a readout signal for reading out the image data to the frame memory at a same time of outputting the refresh signal, and the frame memory outputs the stored image data when the readout signal is given.

According to a twelfth aspect of the present invention, in the third aspect of the present invention, wherein when an off-sequence signal that is an alternating current voltage having a predetermined frequency and erase data for erasing the data voltage written into the pixel formation portions are given to the display control unit in a case of stopping an operation of the liquid crystal display device, the timing control circuit generates the refresh signal based on the off-sequence signal and outputs the generated refresh signal to the polarity bias management circuit and the polarity reverse control circuit, the polarity bias management circuit increases or decreases the polarity bias value by "1" in the direction specified by the polarity signal every time a polarity of the off-sequence signal is changed, and the erase data is given to the drive unit.

According to a thirteenth aspect of the present invention, in the second aspect of the present invention, further including:

data signal lines and scanning signal lines, both of which are configured to connect the pixel formation portions and the drive unit and are formed in the display unit, wherein each of the pixel formation portions includes:

a pixel capacitance configured to hold the data voltage; and a switching element having a control terminal connected to the scanning signal line, a first conduction terminal connected to the data signal line, and a second conduction terminal connected to the pixel capacitance, and the switching element includes a thin film transistor having a channel layer formed of an oxide semiconductor.

According to a fourteenth aspect of the present invention, in the third aspect of the present invention, wherein the oxide semiconductor contains indium gallium zinc oxide.

A fifteenth aspect of the present invention is directed to a liquid crystal display device that displays an image represented by inputted image data on a display unit by applying a data voltage corresponding to the image data to a liquid crystal layer of the display unit, the method including:

a step of driving a drive unit to apply the data voltage to the liquid crystal layer;

a step of managing a polarity bias of the data voltage in a predetermined period unit; and a step of controlling the drive unit in a direction in which the polarity bias of the data voltage is eliminated in a frame period for updating the image displayed on the display unit.

Effects of the Invention

In accordance with the first aspect of the present invention, the display control unit of the liquid crystal display device manages the polarity bias of the data voltage in the predetermined period unit. In the frame period for updating the image displayed on the display unit, the drive unit is driven in the direction in which the stored polarity bias of the data voltage is eliminated. In this manner, the polarity bias stored until the frame period for updating the image is directed to the direction in which the polarity bias is eliminated. As a result, when the liquid crystal display device is driven, the charges due to the uneven distribution of the impurity ions are unlikely to be stored in the liquid crystal layer, and accordingly, the occurrence of the flicker or the like is suppressed.

In accordance with the second aspect of the present invention, the display control unit of the liquid crystal display device specifies the direction in which the polarity bias value representing the polarity bias is increased or decreased, and drives the drive unit to apply the data voltage to each of the plurality of pixel formation portions, the data voltage having the polarity bias value changed in the specified direction for each of the frame period for updating the image and of frame periods subsequent to the frame period. In this manner, the polarity bias stored until the frame period for updating the image is gradually eliminated in each of the frame periods subsequent to the frame period.

In accordance with the third aspect of the present invention, when the polarity signal is given from the polarity reverse control circuit, the polarity bias management circuit controls the polarity bias value in the direction in which the polarity bias value approaches "0" in the case where the polarity bias value at the point of time when the refresh signal is generated is not "0", and controls the polarity bias value in the direction in which the polarity bias value is reversed in the case where the polarity bias value is "0". In this manner, the polarity bias value obtained for each of the subsequent frame periods is unlikely to deviate from "0" to a large extent. As a result, when the liquid crystal display device is driven, the charges due to the uneven distribution of the impurity ions are unlikely to be stored in the liquid crystal layer, and accordingly, the occurrence of the flicker or the like is suppressed.

In accordance with the fourth aspect of the present invention, every time the vertical synchronizing signal used for displaying the image on the display unit is given, the polarity bias management circuit increases or decreases the polarity bias value by "1" in the direction specified by the polarity signal given from the polarity reverse control circuit, and thereby obtains the polarity bias value. In this manner, the polarity bias management circuit can obtain the polarity bias value with ease.

In accordance with the fifth aspect of the present invention, the periodical refreshment is performed when the count value of the NREF counter reaches the predetermined number during the pause drive, and the timing control circuit generates the refresh signal. In this manner, the polarity bias value is obtained by being increased or decreased by "1" in the direction specified by the polarity signal obtained in the polarity reverse control circuit. As a result, the polarity bias value obtained for each of the frame periods after the periodical refreshment is unlikely to deviate from "0" to a large extent, and the occurrence of the flicker or the like is suppressed.

In accordance with the sixth aspect of the present invention, when the forced refresh signal is given during the pause drive, the timing control circuit generates the refresh signal. In this manner, the polarity bias value is obtained by being increased or decreased by "1" in the direction specified by the polarity signal obtained in the polarity reverse control circuit. As a result, the polarity bias value obtained for each of the frame periods after the forced refreshment is unlikely to deviate from "0" to a large extent, and the occurrence of the flicker or the like is suppressed.

In accordance with the seventh aspect of the present invention, when the command to horizontally or vertically reverse the image displayed on the display unit is given, the timing control circuit generates the refresh signal. In this manner, the polarity bias value is obtained by being increased or decreased by "1" in the direction specified by the polarity signal obtained in the polarity reverse control circuit. As a result, the polarity bias value, which is obtained for each of the frame periods after the image is reversed by the command, is unlikely to deviate from "0" to a large extent, and the occurrence of the flicker or the like is suppressed.

In accordance with the eighth aspect of the present invention, in the case where the liquid crystal display device shifts from the pause drive to the high frequency drive reversed therefrom, when the high frequency synchronizing signal generated in synchronization with the cycle of the high frequency drive is given to the display control unit, the timing control circuit generates the refresh signal in synchronization with the cycle of the high frequency drive. In this manner, the polarity reverse control circuit also generates the polarity signal in synchronization with the cycle of the high frequency drive, and accordingly, the polarity bias management circuit controls the polarity bias value in the direction in which the polarity bias value approaches "0" in the case where the polarity bias value is not "0", and controls the polarity bias value in the direction in which the polarity bias value is reversed in the case where the polarity bias value is "0". Therefore, even in the case where the polarity bias value at the time of the pause drive deviates from "0" to a large extent, the liquid crystal display device shifts to the high frequency drive, whereby the polarity bias value approaches "0" by "1" every frame period, and when the polarity bias value becomes "0", the polarity bias value alternately repeats "+1" and "0" or "0" and "−1". As a result, the polarity bias value becomes substantially "0" in the high frequency drive, and accordingly, the occurrence of the flicker or the like is suppressed.

In accordance with the ninth aspect of the present invention, the timing control circuit resets the NREF counter in the case of outputting the refresh signal, and accordingly, the NREF count value stored in the NREF counter until then becomes "0". Therefore, the periodical refreshment can be performed at appropriate timing.

In accordance with the tenth aspect of the present invention, there are provided the positive gamma circuit for generating the positive image data and the negative gamma circuit for generating the negative image data, both of which are selectable by the selector. Based on the polarity signal generated in the polarity reverse control circuit, the selector gives the inputted image data to the positive gamma circuit in the case of controlling the polarity bias value in the direction of increasing the polarity bias value, and gives the inputted image data to the negative gamma circuit in the case of controlling the polarity bias value in the direction of decreasing the polarity bias value. In this manner, the polarity bias of the voltage applied to the liquid crystal layer can be made to coincide with the polarity bias value managed by the polarity bias management circuit.

In accordance with the eleventh aspect of the present invention, the image data transmitted from the host is stored in the frame memory, and the readout signal is given when the refresh signal is outputted from the timing control circuit, whereby the image data can be read out. In this manner, the image data can be read out from the frame memory in the case of updating the image displayed on the display unit, and accordingly, the image can be updated with ease.

In accordance with the twelfth aspect of the present invention, when the off-sequence signal that is an alternating current voltage having a predetermined frequency and the erase data for erasing the data voltage written into the pixel formation portions are given, in the off-sequence period set in advance, in order to stop the operation of the liquid crystal display device, the timing control circuit generates the refresh signal every time the polarity of the off-sequence signal is changed. In this manner, the polarity reverse control circuit generates the polarity signal every time the polarity of the off-sequence signal is changed, and accordingly, even if the polarity bias value immediately before the off-sequence signal is inputted deviates from "0" to a large extent, if the off-sequence period still remains when the polarity bias value approaches "0" by "1" every frame period and then becomes "0", the polarity bias value alternately repeats "0" and "+1" or "0" and "−1" in the residual period. As a result, the polarity bias value becomes substantially "0" before the operation of the liquid crystal display device is stopped, and accordingly, the occurrence of the flicker and the like is suppressed when the power supply is turned on again. Moreover, a wait time heretofore required until the polarity bias value is set to "0" becomes unnecessary. In this manner, the time since the power supply is turned off until the operation is stopped can be shortened, and accordingly, the liquid crystal display device can be used more easily.

In accordance with the thirteenth aspect of the present invention, the thin film transistor in which the channel layer is formed of the oxide semiconductor is used as the switching element of each pixel formation portion in the active matrix-type liquid crystal display device. In this manner, the off-leak current of the thin film transistor is reduced to a large extent, and the voltage written into the pixel capacitance of each pixel formation portion is held for a longer period. Moreover, the alternating current voltage is applied, whereby the polarity bias of the applied voltage to the liquid crystal layer can be reduced by the control of the drive unit on and after the point of time when the OFF signal is inputted. Hence, in the case of performing the pause drive and the high frequency drive, the power consumption for the image display can be reduced to a large extent while the generation of the flicker, and the like are suppressed.

In accordance with the fourteenth aspect of the present invention, indium gallium zinc oxide is used as the oxide semiconductor that forms the channel layer of the thin film transistor included in each pixel formation portion, whereby effects similar to those of the twelfth invention can be reliably obtained.

In accordance with the fifteenth aspect of the present invention, an effect similar to the effect of the first invention is obtained.

BRIEF DESCRIPTION OF THE DRAWINGS

FIGS. 9(A) and 9(B) are schematic views showing distributions of impurity ions in a liquid crystal layer of a pixel formation portion in the high frequency drive, and more specifically, FIG. 9(A) is a schematic view showing a state in which the high frequency drive is performed in a state where impurity ions of the pixel formation portion are unevenly distributed; and FIG. 9(B) is a schematic view showing a state in which the high frequency drive is performed in a state where the uneven distribution of the impurity ions in the pixel formation portion is eliminated.

MODES FOR CARRYING OUT THE INVENTION

0. Basic Study 0.1 Pause Drive

Figure 1:
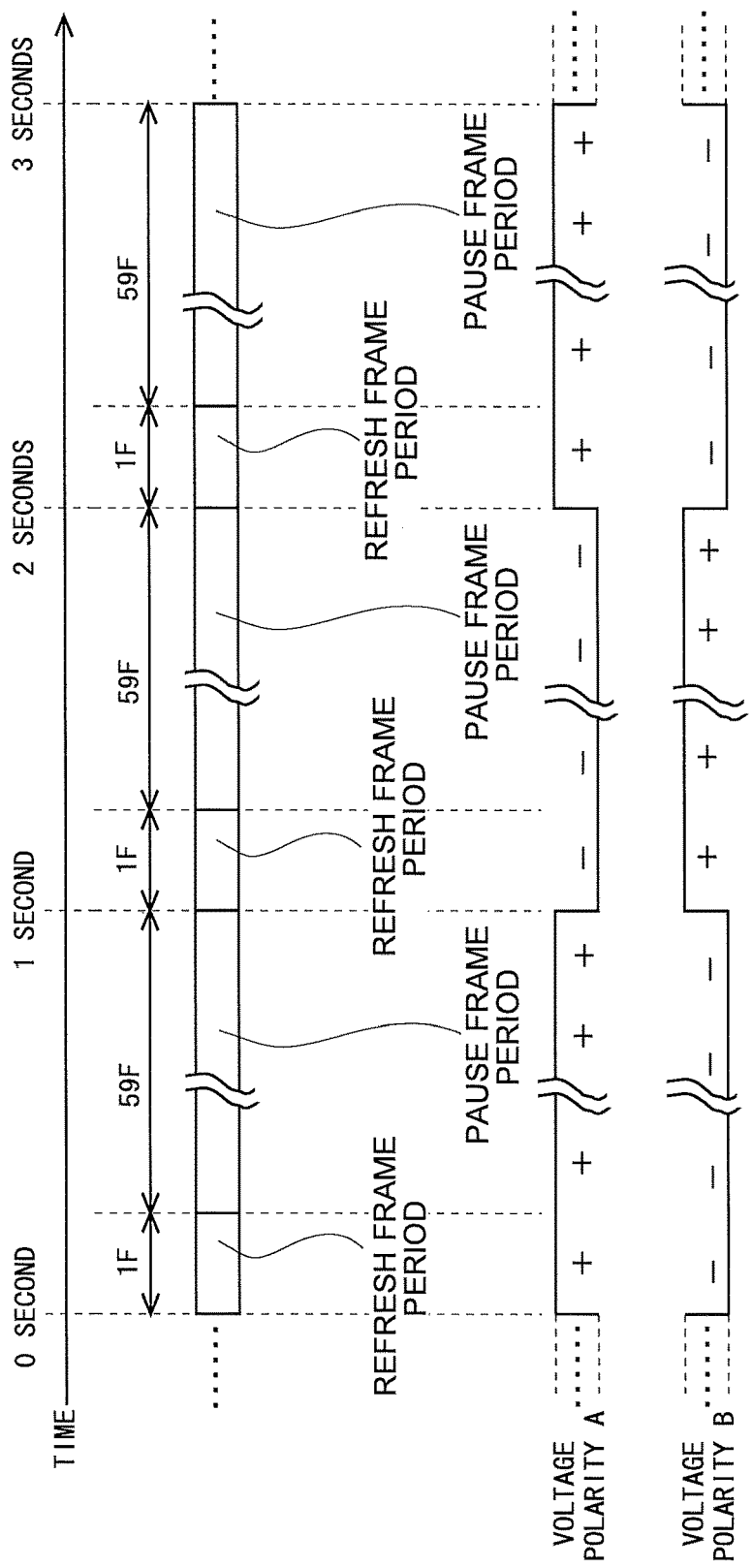
FIG. 1 is a timing chart for describing a pause drive of a liquid crystal display device.

A polarity bias of an applied voltage to a liquid crystal layer (hereinafter, also simply referred to as a "polarity bias"), which is regarded as a problem in the present invention, is caused by a pause drive, and accordingly, the pause drive is first described. FIG. 1 is a timing chart for describing a pause drive of a liquid crystal display device. In this example, write of a data voltage by an amount of one screen is performed during one frame period, and the write of the data voltage is paused during subsequent 59 frame periods. That is, a display unit of the liquid crystal display device is driven so that one refresh frame period and 59 pause frame periods appear alternately. Hence, a refresh rate is 1 Hz, and a refresh cycle is 1 second.

Moreover, in this example, a polarity of the data voltage, which is to be written into a pixel formation portion for each refresh frame period, is reversed. In FIG. 1, a voltage polarity A indicates a polarity of a data voltage written into one pixel formation portion (that is, a polarity of a voltage held in a pixel capacitance of the pixel formation portion), and a voltage polarity B indicates a polarity of a data voltage written into other pixel formation portion, the polarity being different from the polarity of the data voltage written into the one pixel formation portion during the same frame period. As understood from the voltage polarities A and B shown in FIG. 1, the polarity of the data voltage held in the pixel capacitance in each of the pixel formation portions is reversed every second, and accordingly, the polarity of the data voltage applied to the liquid crystal layer is also reversed every second. In this manner, a reversal period of the polarity of the data voltage applied to the liquid crystal layer (hereinafter, simply referred to as a "reversal period")

is extremely long as compared to a reversal period (one frame period=16.67 ms) in a usual liquid crystal display device that does not perform the pause drive.

The liquid crystal display device applies the voltage to the liquid crystal layer, controls a transmittance of the liquid crystal layer, and thereby displays an image. If a direct current component is contained in the applied voltage to the liquid crystal layer, charge storage (hereinafter, referred to as a "charge bias") occurs due to uneven distribution of impurity ions in the liquid crystal layer, and as a result, a display defect such as a flicker and an afterimage occurs. In order to suppress the occurrence of such a display defect, an alternating current drive is performed in the liquid crystal display device. If the alternating current drive is performed, like the voltage polarities A and B shown in FIG. 1, a temporal average value (or integrated value) of the applied voltage to the liquid crystal layer can be made substantially "0" by reversing the polarities of the applied voltage to the liquid crystal layer every predetermined period (typically, every frame period).

In the description of the pause drive, a frame period for writing a voltage of image data, which represents an image to be displayed, as a data voltage into a pixel formation portion is referred to as a "refresh frame period", and a frame period during which the write of the data voltage is paused is referred to as a "pause frame period". It is defined that "one frame period" is a period for refreshing one screen (that is, rewriting or writing the data voltage), and that a length of the "one frame period" is 16.67 ms which is a length of one frame period in a general display device in which a refresh rate is 60 Hz. However, the present invention is not limited to this.

The refreshment, which rewrites the data voltage held in each pixel formation portion 10 based on the image data so that the polarity of the data voltage is reversed, is performed during the refresh frame period, and the refreshment is paused by turning all of the scanning signal lines GL to a non-selected state during the pause frame period. In a case where forcible refreshment that is based on new image data received from a host 90 (hereinafter, this refreshment is referred to as "forced refreshment") is not performed during this pause period, the refreshment is performed every predetermined period (hereinafter, this refreshment is referred to as "periodical refreshment").

0.2 First Basic Study

Figure 2:
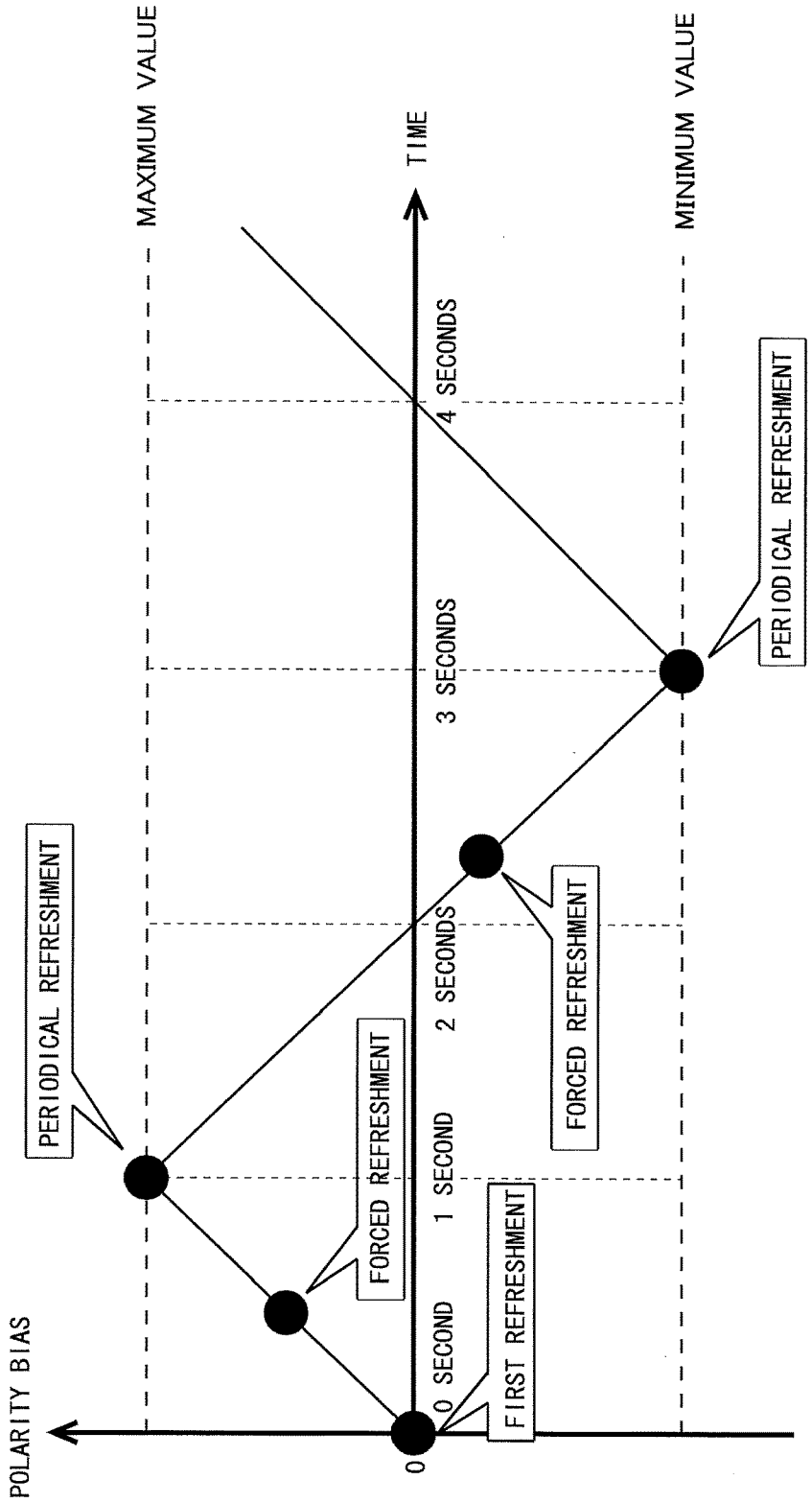
FIG. 2 is a chart showing a change of a polarity bias when the pause drive is performed in the liquid crystal display device.

FIG. 2 is a chart showing a change of the polarity bias when the pause drive is performed in the liquid crystal display device. Here, the polarity bias refers to a difference between a total sum of a time during which a positive data voltage is held in the same pixel formation portion and a total sum of a time during which a negative data voltage is held in the same pixel formation portion. For example, in a case where the polarity bias is expressed while taking one frame period as a unit, this polarity bias is a difference between a total sum of frame periods during which the positive voltage is applied to the same position in the liquid crystal layer and a total sum of frame periods during which the negative voltage is applied to the same position. If this difference is "0", it can be said that there is no polarity bias. The above-described "charge bias" corresponds to this "polarity bias", and both the "charge bias" and the "polarity bias" represent the same state. A degree of this polarity bias is expressed as a "polarity bias value", and in the following description, the "polarity bias value" refers to a difference between a total sum of frame periods during which the positive voltage is applied to the same position in the liquid crystal layer and a total sum of the frame periods during which the negative voltage is applied to the same position. In the example shown in FIG. 2, it is assumed that there is no polarity bias at the point of time when the power supply is turned on (that is, a point of time when t=0 (second)).

First, a description is made of the change of the polarity bias during a period since the power supply is turned on until one second elapses, that is, during a period of t=0 to 1. When the power supply is turned on, a first one frame period becomes the refresh period, and subsequent 29 frame periods become the pause period. During this pause period, the data voltage, which is written into each pixel formation portion during a first refresh period, is held approximately as it is. Hence, in this period, the polarity bias value is increased monotonously (linearly).

After elapse of the 30 frame periods, the period becomes a forced refresh period during which the forced refreshment is performed based on the image data given from the host, and subsequent 29 frame periods become the pause period. During this pause period, the data voltage, which is written into each pixel formation portion during the forced refresh period, is held approximately as it is. Hence, also in this period, the polarity bias value is increased monotonously (linearly), and reaches a maximum value when a frame period immediately before the point of time t=1 has elapsed.

Next, a description is made of a change of the polarity bias in a period of t=1 to 2. A first one frame period after the point of time t=1 (a point of time when one second has elapsed after the power supply is turned on) becomes a periodical refresh period, and there is performed periodical refreshment of applying the same data voltage as the data voltage applied in the immediately previous forced refreshment. In a case of the write of the data voltage in this periodical refresh period, the polarity of the applied voltage to the liquid crystal layer (that is, the data voltage held in each pixel formation portion) is reversed. Then, subsequent 59 frames become the pause period. During this pause period, the data voltage, which is written into each pixel formation portion during a first frame period after the point of time t=1, is held. Hence, during the period of t=1 to 2, the polarity bias value is decreased monotonously (linearly), and the polarity bias is eliminated at the point of time t=2, and the polarity bias value becomes "0". That is, a total sum of a time during which a positive voltage is applied to the liquid crystal layer until the point of time t=2 and a total sum of a time during which a negative voltage is applied thereto until the point of time t=2 become the same. This represents that the polarity bias generated during the period of t=0 to 1 is canceled by the polarity bias generated during the period of t=1 to 2.

Next, a description is made of a change of the polarity bias in a period of t=2 to 3. Frame periods from a first frame period to a fifteenth frame period after the point of time t=2 become a pause period. During this pause period, the data voltage, which is written into each pixel formation portion during a first refresh period after the point of time t=1, is held approximately as it is. Hence, in this period, the polarity bias is decreased monotonously (linearly). When the 15 frame periods elapse, the forced refreshment is performed based on the image data given from the host during 16 frame periods, and 44 frame periods after the forced refreshment is performed become the pause period. During this pause period, the data voltage, which is written into each pixel formation portion during the forced refresh period, is held approximately as it is. Hence, also in this period, the polarity bias value is decreased monotonously (linearly), and reaches a minimum value when a frame period immediately before the point of time t=3 has elapsed.

Next, a description is made of a change of the polarity bias in a period of t=3 to 4. A first one frame period after the point of time t=3 becomes the periodical refresh period, and there is performed the periodical refreshment of applying the same data voltage as the data voltage applied in the immediately previous refreshment. The polarity of the applied voltage to the liquid crystal layer is reversed by the write of the data voltage in this periodical refresh period. Then, subsequent 59 frames become the pause period. During this pause period, the data voltage, which is written into each pixel formation portion during a first frame period after the point of time t=3, is held. Hence, during the period of t=3 to 4, the polarity bias value is increased monotonously (linearly), and the polarity bias is eliminated at the point of time t=4, and the polarity bias value becomes "0". That is, a total sum of a time during which the positive voltage is applied to the liquid crystal layer until the point of time t=4 and a total sum of a time during which the negative voltage is applied thereto until the point of time t=4 become the same. This represents that the polarity bias generated during the period of t=2 to 3 is canceled by the polarity bias generated during the period of t=3 to 4.

Similarly to the above, in the pause drive, each pixel formation portion holds the data voltage, which is applied by the forced refreshment, as it is without reversing the polarity thereof also during the pause drive. In this manner, in the pause drive, with regard to the polarity bias, the polarity of the applied voltage is reversed every time the periodical refreshment is performed, and the monotonous increase/decrease of the polarity bias value in the subsequent pause period is repeated. However, in the case where the forced refreshment is performed, the polarity of the applied voltage is not reversed, and the monotonous increase/decrease of the polarity bias value in the subsequent pause period is repeated. In this manner, regardless of whether or not the forced refreshment is performed, the polarity bias value repeats the increase and decrease thereof between the maximum value and the minimum value. Therefore, when the power supply of the liquid crystal display device is turned off when the polarity bias value is a value approximate to the maximum value or the minimum value, a state is brought in which the direct current voltage is applied to the liquid crystal layer also while the power supply is turned off. When the power supply of the liquid crystal display device is turned on again in such a state, the display defect such as the flicker and the afterimage is likely to occur.

In the above, the description is made of the case where, even if the forced refreshment is performed, the polarity of the applied voltage, that is, the direction of the polarity bias is not always reversed. However, the polarity of the applied voltage may always be reversed every time the forced refreshment is performed. Also in this case, when the power supply of the liquid crystal display device is turned off when the polarity bias value is a value approximate to the maximum value or the minimum value, a state is brought in which the direct current voltage is applied to the liquid crystal layer also while the power supply is turned off. When the power supply of the liquid crystal display device is turned on again in such a state, the display defect such as the flicker and the afterimage is likely to occur.

0.3 Second Basic Study

Figure 3:
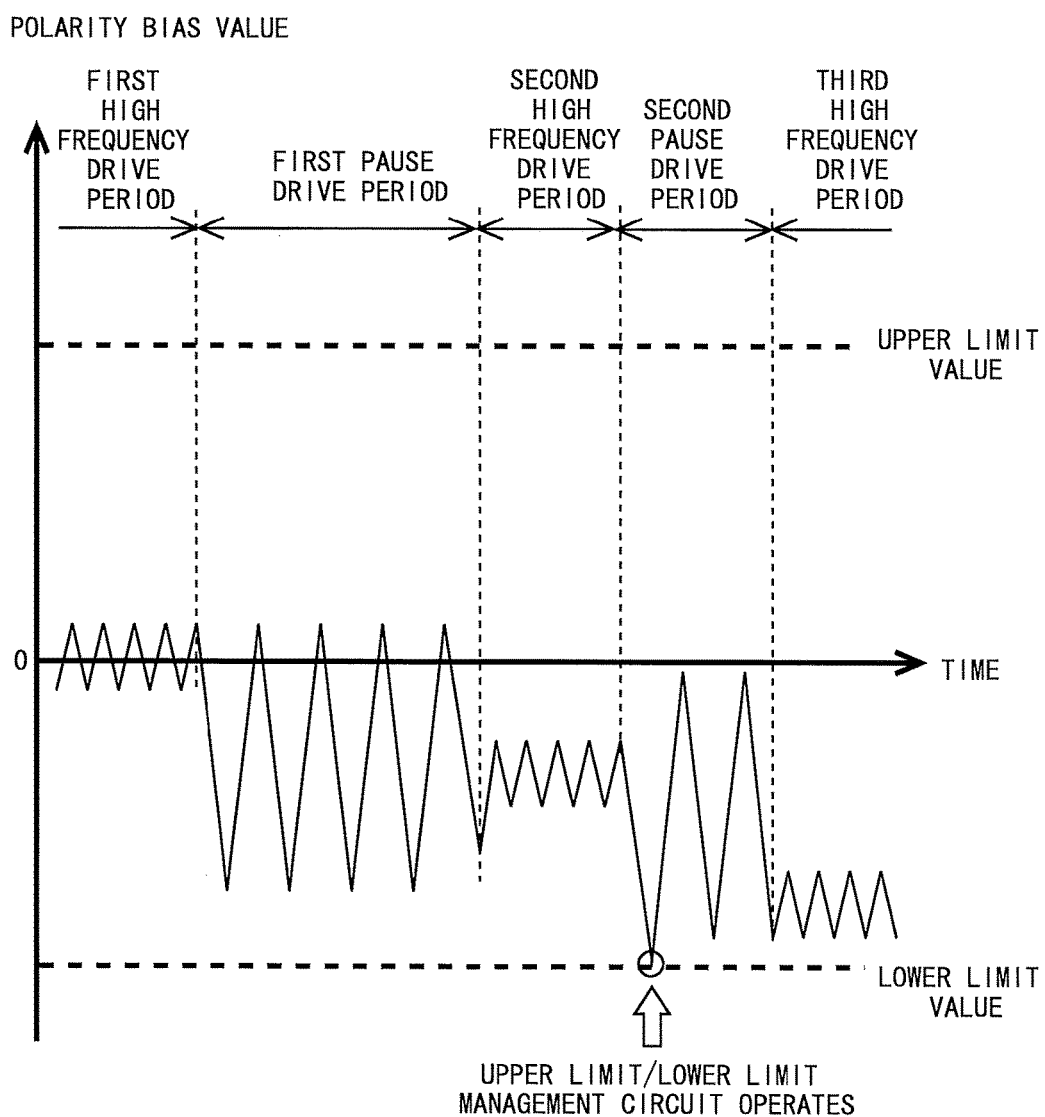
FIG. 3 is a chart showing a change of a polarity bias in a case where a high frequency drive and the pause drive are alternately switched in the liquid crystal display device.

FIG. 3 is a chart showing a change of the polarity bias in the case where the high frequency drive and the pause drive are alternately switched in the liquid crystal display device. When the liquid crystal display device operates while switching the high frequency drive and the pause drive (also referred to as "low frequency drive"), then as shown in FIG. 3, the polarity bias value sometimes reaches a lower limit value thereof when the drive is switched from a second high frequency drive period, during which the drive is performed in a state where the polarity bias is biased to a negative polarity side, to a second pause drive period. Accordingly, as shown in FIG. 3, for example, in order that the polarity bias value at the time of the pause drive is away from the lower limit value, an upper limit/lower limit management circuit is provided in the display control unit, and refreshment with a reverse polarity is forcibly performed. In this manner, the polarity bias value is adjusted so as to be a value between the upper limit value and lower limit value.

Moreover, depending on timing at which the drive period is switched from the second pause drive period to a third high frequency drive period, the drive is sometimes switched to the high frequency drive with the polarity bias value being approximate to the lower limit value, as shown in FIG. 3. In this case, the high frequency drive is performed, whereby the increase or decrease of the polarity bias value by "1" from a value immediately after the drive is switched from the pause drive to the high frequency drive is repeated every frame period. Accordingly, the polarity bias value becomes substantially the same value as the value immediately after the drive is switched to the high frequency drive. As described above, if the liquid crystal display device is driven for a long time in a state where the polarity bias value is a value approximate to the upper limit value or the lower limit value, there is brought the same state as a state where the direct current voltage component is applied to the liquid crystal layer for a long time. In this case, when the liquid crystal display device operates, the display defect such as the flicker and the afterimage is likely to occur. Moreover, if the power supply of the liquid crystal display device is turned off in a state where the polarity bias is large, a state is brought where the direct current voltage is applied to the liquid crystal layer also while the power supply is turned off. Accordingly, the display defect such as the flicker and the afterimage is likely to occur when the power supply is turned on again.

It is considered that the problem of the display defect caused by the polarity bias that occurs in the above-described first and second basic studies is caused by the charge storage due to the uneven distribution of the impurity ions in the liquid crystal layer, and that this charge storage occurs due to the polarity bias of the data voltage applied to the liquid crystal layer. Therefore, the display defect such as the flicker and the afterimage cannot be eliminated even if the conventional off-sequence for discharging the charges stored in the pixel capacitance when the power supply is turned off is performed. In this connection, a description is made below of embodiments of the present invention, which is made based on the above-described basic studies and in order to solve the problem of the display defect caused by the polarity bias.

1. First Embodiment 1.1 Entire Configuration and Summary of Operations

Figure 4:
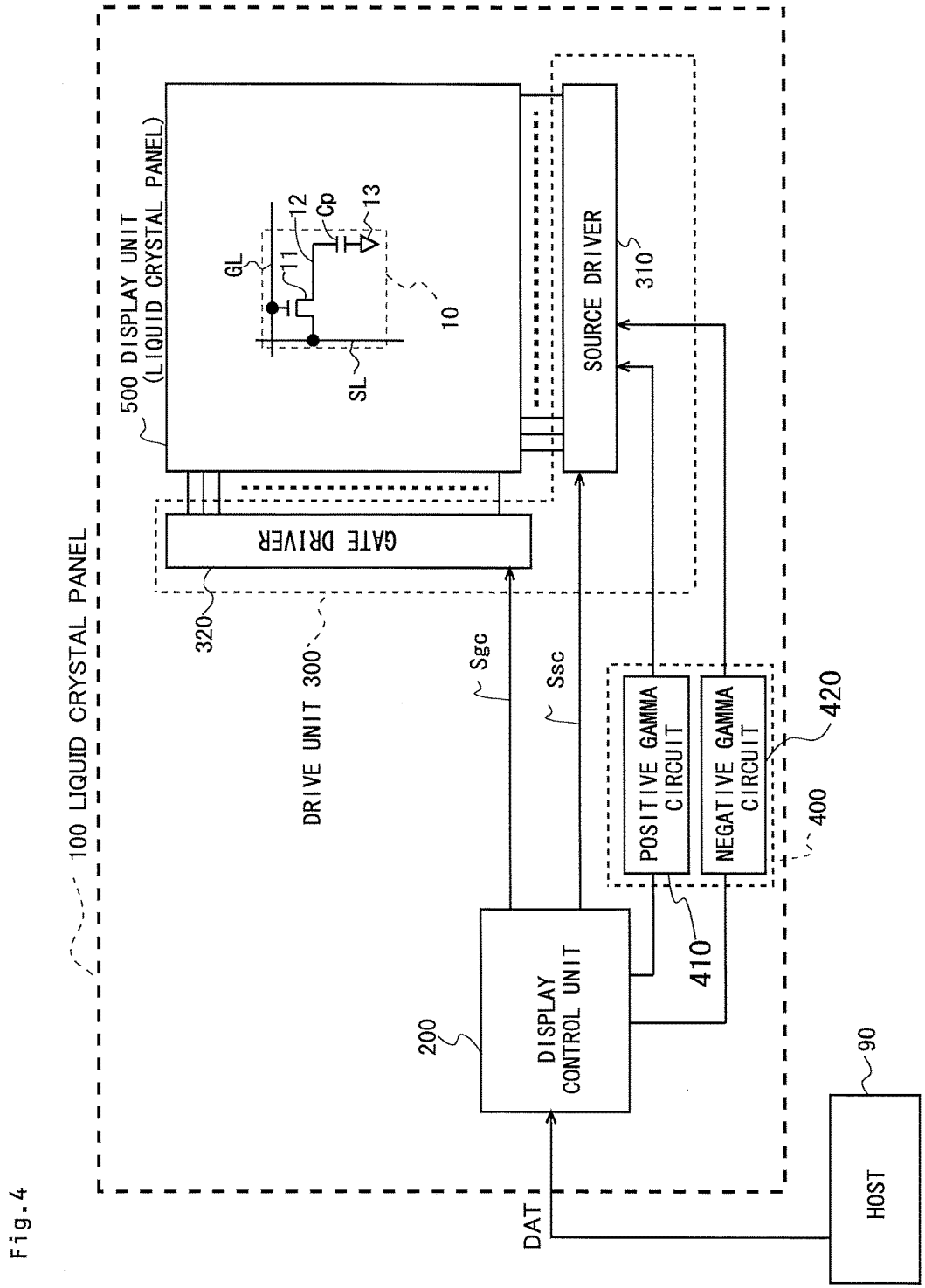
FIG. 4 is a block diagram showing a configuration of a liquid crystal display device according to a first embodiment of the present invention.

FIG. 4 is a block diagram showing a configuration of a liquid crystal display device 100 according to a first embodiment of the present invention. This liquid crystal display device 100 includes: a display control unit 200; a drive unit 300; a gamma unit 400; and a display unit 500. The drive unit 300 includes: a source driver 310 as a data signal line drive circuit; and a gate driver 320 as a scanning signal line drive circuit. The gamma unit 400 includes: a positive gamma circuit 410 that outputs, to the source driver 310, image data included in data DAT transmitted from a host 90 as positive image data; and a negative gamma circuit 420 that outputs, to the source driver 310, the image data as negative image data. On a liquid crystal panel that constitutes the display unit 500, both or one of the source driver 310 and the gate driver 320 may be formed integrally therewith. On an outside of the liquid crystal display device 100, the host 90 mainly configured by a CPU (Central Processing Unit) is provided. The host 90 gives the data DAT, which includes the image data, a command necessary to display an image on the display unit 500, an off-sequence signal given when the power supply is turned off, and the like to the liquid crystal display device 100.

In the display unit 500, there are formed: a plurality of data signal lines SL; a plurality of scanning signal lines GL; and a plurality of pixel formation portions 10 arranged in a matrix so as to correspond to the plurality of data signal lines SL and the plurality of scanning signal lines GL. For convenience, FIG. 4 shows: one pixel formation portion 10; and one data signal line SL and one scanning signal line GL, which correspond to the one pixel formation portion 10. Each pixel formation portion 10 includes: a thin film transistor (TFT) 11 operating as a switching element, in which a gate terminal (also referred to as a "control terminal") is connected to the scanning signal line GL corresponding to the pixel formation portion 10, and a source terminal (also referred to as a "first conduction terminal") is connected to the data signal line SL corresponding to the pixel formation portion 10; a pixel electrode 12 connected to a drain terminal (also referred to as a "second conduction terminal") of the TFT 11; a common electrode 13 provided commonly to the above-described plurality of pixel formation portions 10; and a liquid crystal layer, which is sandwiched between the pixel electrode 12 and the common electrode 13, and is provided commonly to the plurality of pixel formation portions 10. Moreover, a liquid crystal capacitance formed of the pixel electrode 12 and the common electrode 13 composes a pixel capacitance Cp. Note that, typically, an auxiliary capacitance is provided in parallel to a liquid crystal capacitance in order to reliably hold a voltage in the pixel capacitance Cp, and accordingly, in actual, the pixel capacitance Cp is composed of the liquid crystal capacitance and the auxiliary capacitance.

In this embodiment, as the TFT 11, for example, a TFT using an oxide semiconductor for a channel layer is used. More specifically, the channel layer of the TFT 11 is formed of an oxide semiconductor containing InGaZnO (indium gallium zinc oxide) composed of indium (In), gallium (Ga), zinc (Zn) and oxygen (O). In the TFT containing InGaZnO, an off-leak current thereof is extremely small as compared to that of a silicon-based TFT using polycrystalline silicon, amorphous silicon or the like for the channel layer. Therefore, the voltage written into the pixel capacitance Cp can be held for a longer period with a voltage value thereof maintained. Note that a similar effect is obtained even in a case of using, for the channel layer, an oxide semiconductor containing, for example, at least one of indium, gallium, zinc, copper (Cu), silicon (Si), tin (Sn), aluminum (Al), calcium (Ca), germanium (Ge) and lead (Pb) as an oxide semiconductor other than InGaZnO. Moreover, it is an example that the oxide semiconductor is used as the channel layer of the TFT 11, and in place of this, a silicon-based semiconductor such as the polycrystalline silicon and the amorphous silicon may be used.

Typically, the display control unit 200 is realized by an IC (Integrated Circuit). Upon receiving, from the host 90, data DAT which includes image data representing an image to be displayed, the display control unit 200 generates and outputs a source driver control signal Ssc, a gate driver control signal Sgc, a common voltage signal, and the like. The source driver control signal Ssc is given to the source driver 310, the gate driver control signal Sgc is given to the gate driver 320, and the common voltage signal is given to the common electrode 13 provided in the display unit 500.

In response to the source driver control signal Ssc, the source driver 310 generates and outputs a data voltage, which is to be given to each data signal line SL, based on the image data given from the positive gamma circuit 410 or the negative gamma circuit 420. For example, the source driver control signal Ssc includes: a source start pulse signal; a source clock signal; a latch strobe signal; and the like. In response to the source driver control signal Ssc as described above, the source driver 310 operates a shift register, a sampling latch circuit, and the like (not shown) in an inside thereof, converts the image data into an analog signal by a DA conversion circuit (not shown), and thereby generates the data voltage. Moreover, the source driver 310 includes an amplifier (not shown) that amplifies the positive data voltage and an amplifier that amplifies the negative data voltage, and the data voltage is amplified by the amplifier selected in response to the polarity thereof, and is outputted to the display unit 500.

In response to the gate driver control signal Sgc, the gate driver 320 repeats application of an active scanning signal to each scanning signal line GL in a predetermined cycle. For example, the gate driver control signal Sgc includes: a gate clock signal; and a gate start pulse signal. In response to the gate clock signal and the gate start pulse signal, the gate driver 320 generates a shift register and the like (not shown) in an inside thereof, and thereby generates the above-described scanning signal.

As described above, the data voltage is applied to each data signal line SL, the scanning signal is applied to each scanning signal line GL, whereby the image represented by the image data included in the data DAT transmitted from the host 90 is displayed on the display unit 500 of the liquid crystal panel.

1.2 Configuration of Display Control Circuit

Figure 5:
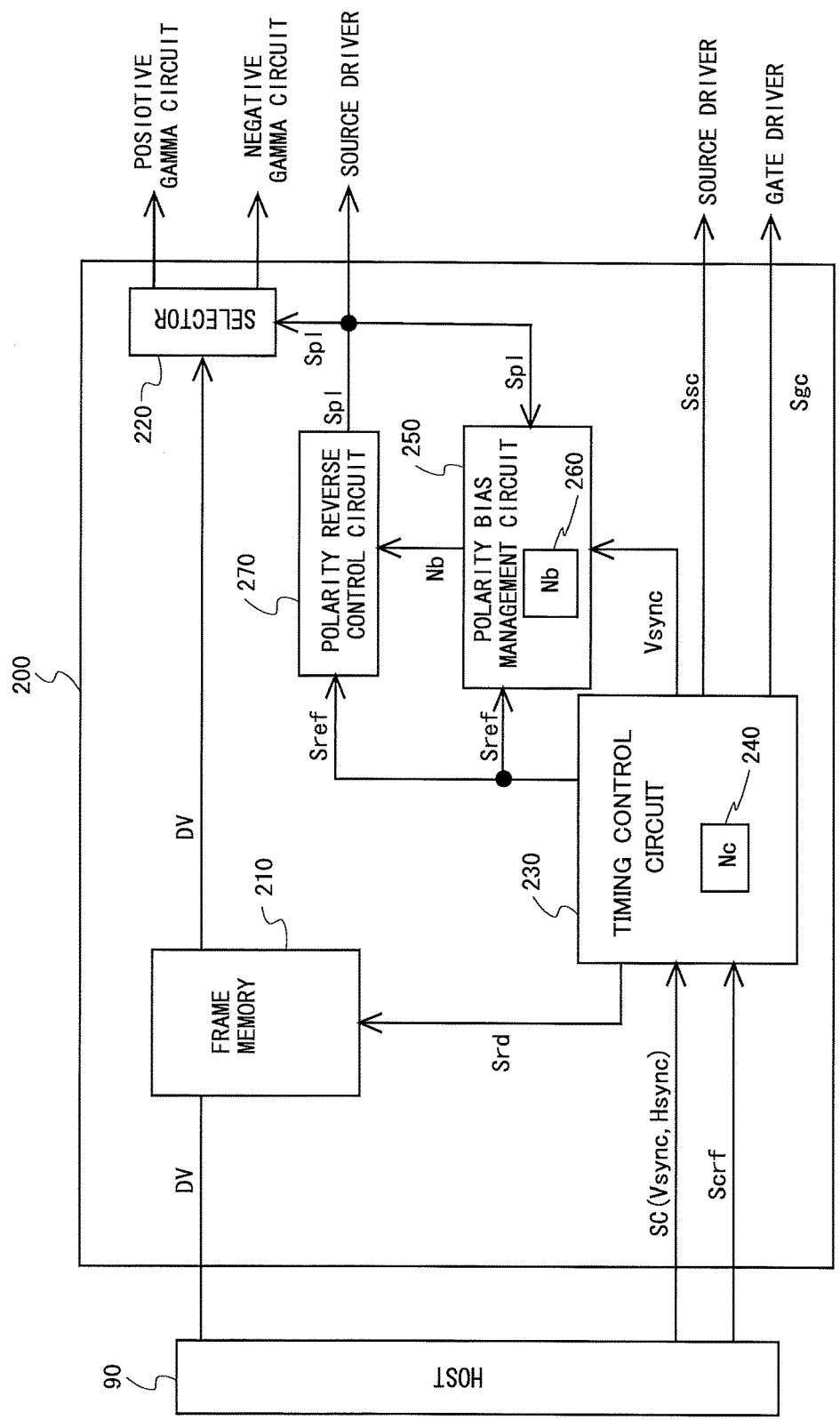
FIG. 5 is a block diagram showing a configuration of a display control unit included in the liquid crystal display device of this embodiment.

FIG. 5 is a block diagram showing a configuration of the display control unit 200 included in the liquid crystal display device 100 of this embodiment. As shown in FIG. 5, the display control unit 200 includes: a frame memory 210; a timing control circuit 230; a polarity bias management circuit 250; a polarity reverse control circuit 270; and a selector 220. The data DAT transmitted from the host 90 includes: image data DV; control signals SC such as a vertical synchronizing signal Vsync and a horizontal synchronizing signal Hsync; and a forced refresh signal Scrf inputted in a case of forcibly refreshing the image.

The frame memory 210 stores, for every frame, the image data DV transmitted from the host 90, and outputs the stored image data DV toward the source driver 310 when a readout signal Srd is given at timing at which a refresh signal Sref to be described later is outputted from the timing control circuit 230 to the polarity bias management circuit 250 or the like. Moreover, also in a case where the forced refresh signal Scrf is given from the host 90 to the timing control circuit 230, the readout signal Srd is given from the timing control circuit 230 to the frame memory 210, and the frame memory 210 outputs the stored image data DV. However, in the pause period, the image updated by the periodical refreshment or the forced refreshment continues to be displayed as it is on the display unit 500, and accordingly, the readout signal Srd is not given to the frame memory 210. By providing the frame memory 210, the image data DV can be read out from the frame memory 210 in a case of updating the image displayed on the display unit 500, and accordingly, the image can be updated with ease. In this embodiment, the description is made on the assumption that the image data DV transmitted from the host 90 is stored in the frame memory 210; however, the image data DV may be directly given to the selector 220 without being stored in the frame memory 210.

The timing control circuit 230 includes a register 240 for storing the number of times of the pause frame period. Hereinafter, this register 240 is referred to as an NREF counter 240, and an NREF count value stored in the NREF counter 240 is denoted by reference symbol "Nc". Every time the timing control circuit 230 receives the vertical synchronizing signal Vsync included in the control signal SC transmitted from the host 90 for each frame period, the timing control circuit 230 increments the NREF count value Nc by "1", and holds the incremented NREF count value Nc in the NREF counter 240 each time, and gives the vertical synchronizing signal Vsync to the polarity bias management circuit 250.

The polarity bias management circuit 250 includes a register 260 for holding the polarity bias value obtained based on the vertical synchronizing signal Vsync. Hereinafter, this register 260 is referred to as a balance counter 260, and the polarity bias value stored in the balance counter 260 is denoted by reference symbol "Nb". Every time the vertical synchronizing signal Vsync is given from the timing control circuit 230, the polarity bias management circuit 250 adds and subtracts the number of times of receiving the vertical synchronizing signal Vsync based on a polarity signal Spl to be described later, and thereby increments and decrements the polarity bias value Nb stored in the balance counter 260 by "1". As described above, unlike the NREF count value Nc, the polarity bias value Nb is incremented or decremented by "1" in a direction specified by the polarity signal Spl to be described later for each pause frame period, each periodical refresh frame period, and each forced refresh frame period. In this manner, the polarity bias value Nb becomes a "positive value, "0", or a "negative value".

When the NREF count value Nc held in the NREF counter 240 becomes the preset maximum value or the preset minimum value, then in order to update the image displayed on the display unit 500, the timing control circuit 230 generates the refresh signal Sref, and gives the generated refresh signal Sref to the polarity bias management circuit 250 and the polarity reverse control circuit 270, and resets the NREF counter 240 and sets the NREF count value Nc to "0". By providing the NREF counter 240, the periodical refreshment can be performed at appropriate timing.

In order to read out the image data DV stored in the frame memory 210, the timing control circuit 230 gives the readout signal Srd to the frame memory 210. In this manner, the frame memory 210 outputs the image data DV stored therein. Moreover, if the forced refresh signal Scrf is given to the timing control circuit 230 until the NREF count value Nc reaches the maximum value or the minimum value, the timing control circuit 230 resets the NREF counter 240 at that point of time and sets the NREF count value Nc to "0", and performs the same operation as the above operation.

When the refresh signal Sref is given from the timing control circuit 230, the polarity bias management circuit 250 reads out the stored polarity bias value Nb from the balance counter 260, and gives the polarity bias value Nb to the polarity reverse control circuit 270. When the refresh signal Sref is given, the polarity reverse control circuit 270 determines whether the polarity bias value Nb given from the polarity bias management circuit 250 is a "positive value" or a "negative value", and generates the polarity signal Spl in response to a result of the determination. The polarity signal Spl is given to the selector 220, the source driver 310, and the polarity bias management circuit 250.

Accordingly, operations of the selector 220, the source driver 310, and the polarity bias management circuit 250 when the polarity signal Spl is given thereto are described in this order. First, a description is made of the operations of the selector 220. If the polarity bias value Nb given from the polarity bias management circuit 250 is a "positive value", the image data DV is given to the negative gamma circuit 420 in order to generate a negative data voltage in the source driver 310 based on the image data DV outputted from the frame memory 210. Meanwhile, if the polarity bias value Nb is a "negative value", the image data DV is given to the positive gamma circuit 410 in order to generate a positive data voltage in the source driver 310 based on the image data DV outputted from the frame memory 210. Accordingly, when the polarity signal Spl is given, the selector 220 selects one of the positive gamma circuit 410 and the negative gamma circuit 420 based on the polarity signal. That is, if the polarity bias value Nb is a "positive value", the selector 220 selects the negative gamma circuit 420 in order to generate the negative data voltage, and if the polarity bias value Nb is a "negative value", the selector 220 selects the positive gamma circuit 410 in order to generate the positive data voltage. In this manner, when the polarity bias value Nb is a "positive value", the negative data voltage is applied to the liquid crystal layer of the pixel formation portion 10, and when the polarity bias value Nb is a "negative value", the positive data voltage is applied to the liquid crystal layer of the pixel formation portion 10. The polarity bias is eliminated in this manner. Accordingly, the polarity bias of the voltage applied to the liquid crystal layer can be made to coincide with the polarity bias value Nb managed by the polarity bias management circuit 250.

When the polarity signal Spl is given to the source driver 310, the source driver 310 selects the amplifier having the same polarity as the polarity of the data voltage. In this manner, the positive data voltage is amplified by the amplifier for the positive data voltage, and the negative data voltage is amplified by the amplifier for the negative data voltage.

Moreover, the polarity bias management circuit 250 operates in the following manner when the polarity signal Spl is given to the polarity bias management circuit 250. That is, if the polarity bias value Nb given to the polarity reverse control circuit 270 is a "positive value", the polarity bias management circuit 250 decrements the polarity bias value Nb, which is counted every pause frame period and every refresh frame period, by "1". Moreover, if the polarity bias value Nb is a "negative value", the polarity bias management circuit 250 increments the polarity bias value Nb, which is counted every pause frame period and every refresh frame period, by "1". As described above, the polarity signal Spl controls the polarity bias management circuit 250 so that the polarity bias value Nb at the point of time when the refresh signal Sref is given approaches "0", and specifies a direction in which the polarity bias value Nb is changed, and every time the vertical synchronizing signal Vsync is given, the polarity bias management circuit 250 increments or decrements the polarity bias value Nb, which is held in the balance counter 260, by "1" in the specified direction.

Note that the high frequency drive is the same as in the case where the forced refreshment is performed continuously every frame period in the pause drive. Therefore, the operations of the display control unit 200 in the high frequency drive are the same as the operations in the forced refreshment, and accordingly, the description of the operations of the display control unit 200 in the high frequency drive is omitted.

1.3 Operation for Eliminating Polarity Bias

Figure 6:
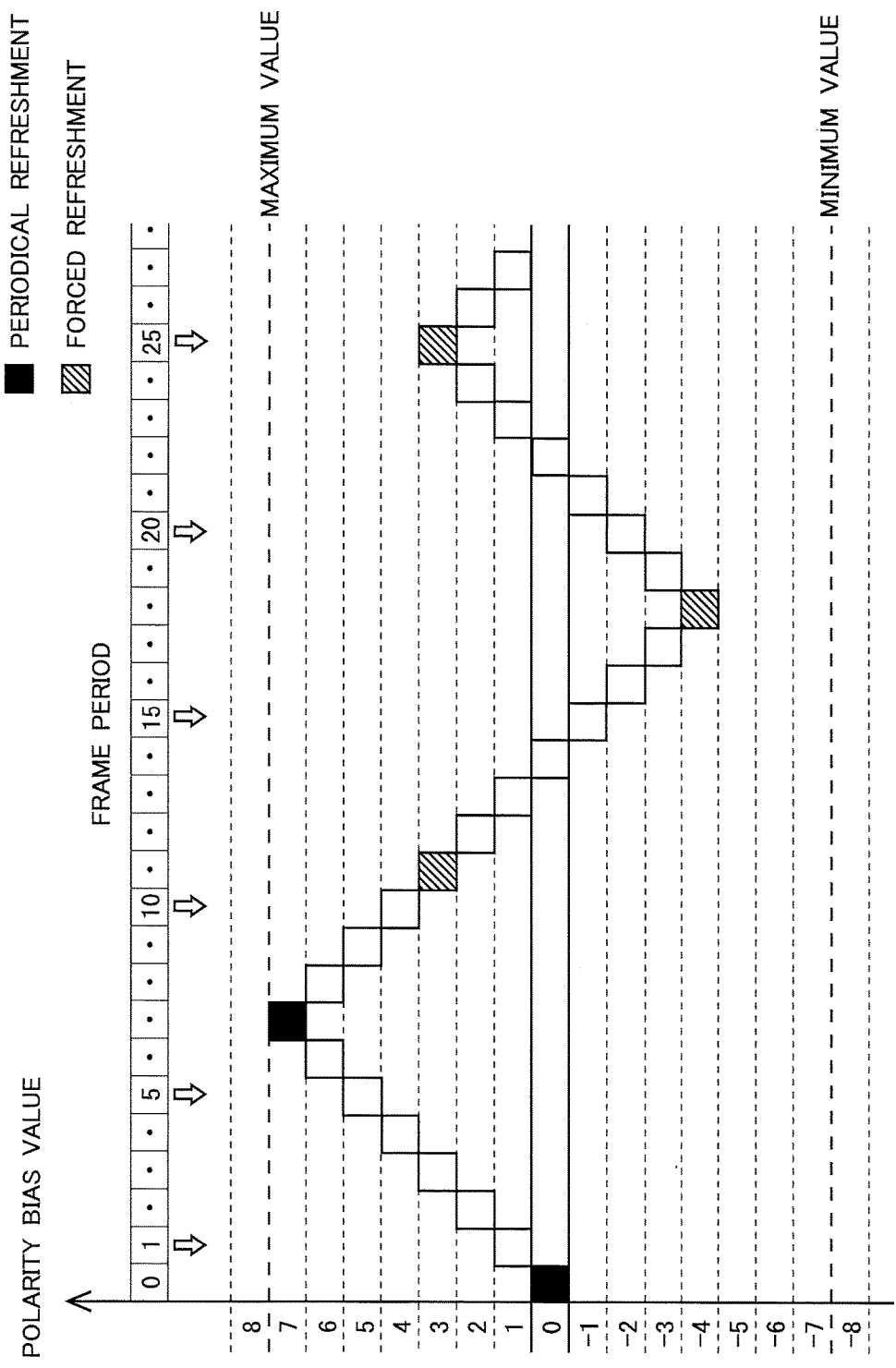
FIG. 6 is a chart showing a method for making an adjustment so that a value of the polarity bias approaches "0" at the time of performing the pause drive in the liquid crystal display device of this embodiment.

FIG. 6 is a chart showing a method for making an adjustment so that the polarity bias value Nb approaches "0" at the time of performing the pause drive in the liquid crystal display device 100 of this embodiment. In FIG. 6, symbols indicating positions of the refreshment indicate positions immediately before the refreshment, that is, top positions of the refresh frames.

As shown in FIG. 6, the polarity bias value Nb in a 0-th frame period before the power supply of the liquid crystal display device 100 is turned on is "0". In the first frame period immediately after the power supply is turned on, when the data DAT including the image data DV is given from the host 90 to the liquid crystal display device 100, the positive data voltage is written into the pixel capacitance Cp of the pixel formation portion 10, whereby the refreshment is performed. Subsequently, also in the pause periods from a second frame period to a seventh frame period, the positive data voltage is held in the pixel capacitance Cp. In this manner, for each of the first frame period as the refresh period and of the pause frame periods of the subsequent second to seventh frame periods, the polarity bias value Nb is incremented by "1", and the incremented polarity bias value Nb is stored each time in the balance counter 260 of the polarity bias management circuit 250. The polarity bias value Nb at the time when the seventh frame period is ended is "+7", which is a "positive value".

Although the image data DV is not updated in an eighth frame period, the polarity bias value Nb reaches "+7", which is the preset maximum value. Therefore, the periodical refreshment is performed in the eighth frame period. The polarity bias value Nb at this time is a "positive value", and accordingly, a direction in which the polarity bias value Nb approaches "0", that is, a direction in which the polarity bias value Nb is reduced is maintained based on the polarity signal Spl outputted from the polarity reverse control circuit 270. Therefore, the periodical refreshment is performed by writing the data voltage in which the polarity is reversed to the negative polarity. Subsequently, also in the pause periods of ninth to eleventh frame periods, the negative data voltage is held in the pixel capacitance Cp. In this manner, for each of the eighth frame period as the periodical refresh period and of the pause frame periods of the subsequent ninth to eleventh frame periods, the polarity bias value Nb is decremented by "1", and the decremented polarity bias value Nb is stored each time in the balance counter 260. The polarity bias value Nb at the time when the eleventh frame period is ended is "+3", which is a "positive value".

Thereafter, the forced refresh signal Scrf is given from the host 90 in a twelfth frame period, and the forced refreshment is performed. The polarity bias value Nb at this time is a "positive value", and accordingly, the direction in which the polarity bias value Nb approaches "0", that is, the direction in which the polarity bias value Nb is reduced is maintained based on the polarity signal Spl. Therefore, the forced refreshment is performed by subsequently writing the negative data voltage into the pixel capacitance Cp. Subsequently, also in the pause periods of thirteenth to eighteenth frame periods, the negative data voltage is held in the pixel capacitance Cp. In this manner, for each of the twelfth frame period as the forced refresh period and of the pause frame periods of the subsequent thirteenth to eighteenth frame periods, the polarity bias value Nb is decremented by "1", and the decremented polarity bias value Nb is stored each time in the balance counter 260. The polarity bias value Nb at the time when the eighteenth frame period is ended is "−4", which is a "negative value".

Once again, the forced refresh signal Scrf is given from the host 90 in a nineteenth frame period, and the forced refreshment is performed. The polarity bias value Nb at this time is a "negative value", and accordingly, based on the polarity signal Spl, the direction of the polarity bias value Nb is changed to the direction in which the polarity bias value Nb approaches "0", that is, the direction in which the polarity bias value Nb is increased. Therefore, the forced refreshment is performed by writing the data voltage in which the polarity is reversed to the positive polarity. Subsequently, also in the pause periods of twentieth to twenty-fifth frame periods, the positive data voltage is held in the pixel capacitance Cp. In this manner, for each of the nineteenth frame period as the forced refresh period and of the pause frame periods of the subsequent twentieth to twenty-fifth frame periods, the polarity bias value Nb is decremented by "1", and the decremented polarity bias value Nb is stored each time in the balance counter 260. The polarity bias value Nb at the time when the twenty-fifth frame period is ended is "+3", which is a "positive value".

Moreover, the forced refresh signal Scrf is given from the host 90 in a twenty-sixth frame period, and the forced refreshment is performed. The polarity bias value Nb at this time is a "positive value", and accordingly, based on the polarity signal Spl, the direction of the polarity bias value Nb is changed to the direction in which the polarity bias value Nb approaches "0", that is, the direction in which the polarity bias value Nb is reduced. Therefore, the forced refreshment is performed by writing the data voltage in which the polarity is reversed to the negative polarity. Subsequently, also in the pause periods of a twenty-seventh frame period and thereafter, the negative data voltage is held in the pixel capacitance Cp. In this manner, for each of the twenty-sixth frame period as the forced refresh period and of the pause frame periods of the subsequent twenty-sixth frame period and thereafter, the polarity bias value Nb is decremented by "1", and the decremented polarity bias value Nb is stored each time in the balance counter 260.

Similarly, every time the periodical refreshment or the forced refreshment is performed, when the polarity bias value Nb given from the polarity bias management circuit 250 to the polarity reverse control circuit 270 is a "positive value", the negative data voltage is written into the pixel capacitance Cp so that the direction of the polarity bias value Nb is changed to the direction in which the polarity bias value Nb approaches "0", that is, the direction in which the polarity bias value Nb is reduced based on the polarity signal Spl, and moreover, the negative data voltage is written also in the subsequent pause periods, and such writing of the negative data voltage is repeated. Meanwhile, when the polarity bias value Nb is a "negative value", the positive data voltage is written into the pixel capacitance Cp so that the direction of the polarity bias value Nb is changed to the direction in which the polarity bias value Nb approaches "0", that is, the direction in which the polarity bias value Nb is increased based on the polarity signal Spl, and moreover, the positive data voltage is written also in the subsequent pause periods, and such writing of the positive data voltage is repeated.

1.4 Effects

In accordance with this embodiment, when the image displayed on the display unit 500 is updated in the pause drive, that is, in the case where the refresh signal Sref is outputted from the timing control circuit 230, in the case where the polarity bias value Nb is a "positive value", the negative data voltage is applied in the refresh period and the subsequent pause frame periods. Meanwhile, in the case where the polarity bias value Nb is a "negative value", the positive data voltage is applied in the refresh period and the subsequent pause frame periods. In this manner, the polarity bias value Nb approaches "0", and accordingly, unlikely to deviate from "0" to a large extent. Therefore, impurity ions 15 are unlikely to be unevenly distributed, and the occurrence of the display defect such as the flicker, the afterimage due to the burn-in of the liquid crystal, and the like can be suppressed.

Moreover, when the liquid crystal display device 100 operates, the polarity bias value Nb is controlled to be directed to "0", and accordingly, the polarity bias value Nb at the point of time when the power supply is turned off is also often in a state approximate to "0". In this manner, the direct current voltage is not continuously applied to the liquid crystal layer during the period in which the power supply is turned off, and accordingly, the occurrence of the display defect such as the flicker and the afterimage, which is likely to occur when the power supply of the liquid crystal display device 100 is turned on, is suppressed.

Moreover, in the case of performing the refreshment, the polarity bias value Nb is controlled to approach "0", and accordingly, the upper limit/lower limit management circuit, which has been heretofore provided in order to manage the polarity bias value Nb so that the polarity bias value Nb does not go beyond the upper limit value and the lower limit value, becomes unnecessary. In this manner, manufacturing cost of the display control unit 200 can be reduced.

2. Second Embodiment

A configuration of a liquid crystal display device 100 according to the second embodiment is the same as the configuration of the liquid crystal display device 100 according to the first embodiment, and accordingly, a block diagram of the liquid crystal display device 100 of this embodiment and a description thereof are omitted.

Moreover, an arrangement of constituents of a display control unit 200 included in the liquid crystal display device 100 is the same as an arrangement of the constituents shown in FIG. 5; however, signals are partially different from those in FIG. 5, and accordingly, different signals are described. In FIG. 5, in the case where the image is updated by the forced refreshment, the forced refresh signal Scrf is given from the host 90 to the timing control circuit 230. However, in this embodiment, a high frequency synchronizing signal generated in synchronization with the cycle of the high frequency drive is given. When the high frequency synchronizing signal is given, the timing control circuit 230 generates the refresh signal Sref in order to update the image displayed on the display unit 500, and gives the generated refresh signal Sref to the polarity bias management circuit 250 and the polarity reverse control circuit 270. Moreover, the refresh signal Sref is also given to the NREF counter 240 in order to reset the NREF counter 240. Note that the image data at the time of the high frequency drive is data for displaying a moving picture. Moreover, operations of the display control unit 200, which follow, are the same as the operations of the display control unit 200 shown in FIG. 5, and accordingly, the description thereof is omitted.

2.1 Operation for Eliminating Polarity Bias

Figure 7:
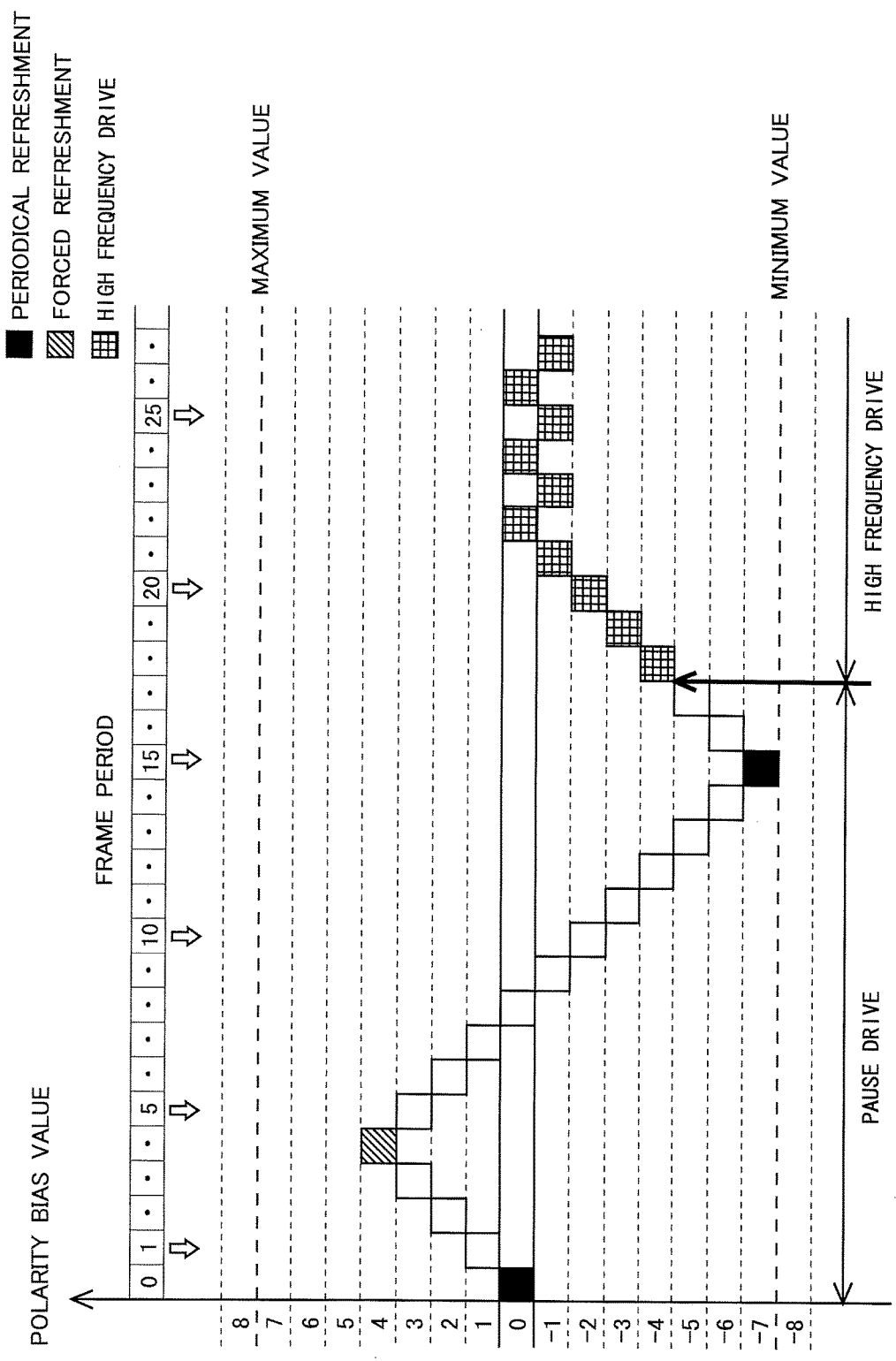
FIG. 7 is a chart showing a method for making an adjustment so that a polarity bias value Nb approaches "0" in a case of operating the liquid crystal display device of this embodiment while switching the same from the pause drive to the high frequency drive.

FIG. 7 is a chart showing a method for making an adjustment so that the polarity bias value Nb approaches "0" in the case of operating the liquid crystal display device 100 of this embodiment while switching the same from the pause drive to the high frequency drive. Also in FIG. 7, similarly to the case in FIG. 6, symbols indicating positions of the refreshment indicate positions immediately before the refreshment, that is, top positions of the refresh frames.

As shown in FIG. 7, the polarity bias value Nb in the 0-th frame period before the power supply of the liquid crystal display device 100 is turned on is "0". In the first frame period immediately after the power supply is turned on, when the data DAT including the image data DV is given from the host 90 to the liquid crystal display device 100, the positive data voltage is written into the pixel capacitance Cp of the pixel formation portion 10, whereby the refreshment is performed. Subsequently, also in the pause periods of second to fourth frame periods, the positive data voltage is held in the pixel capacitance Cp. In this manner, for each of the first frame period as the refresh period and of the pause frame periods of the subsequent second to fourth frame periods, the polarity bias value Nb is incremented by "1", and the incremented polarity bias value Nb is stored each time in the balance counter 260 of the polarity bias management circuit 250. The polarity bias value Nb at the time when the fourth frame period is ended is "+4", which is a "positive value".

The forced refresh signal Scrf is given from the host 90 in a fifth frame period, and the forced refreshment is performed. The polarity bias value Nb at this time is a "positive value", and accordingly, based on the polarity signal Spl outputted from the polarity reverse control circuit 270, the direction of the polarity bias value Nb is changed to the direction in which the polarity bias value Nb approaches "0", that is, the direction in which the polarity bias value Nb is reduced. Therefore, the forced refreshment is performed by writing the data voltage in which the polarity is reversed to the negative polarity. Subsequently, also in the pause periods of sixth to fifteenth frame periods, the negative data voltage is held in the pixel capacitance Cp. In this manner, for each of the fifth frame period as the forced refresh period and of the pause frame periods of the subsequent sixth to fifteenth frame periods, the polarity bias value Nb is decremented by "1", and the decremented polarity bias value Nb is stored each time in the balance counter 260. The polarity bias value Nb at the time when the fifteenth frame period is ended is "−7", which is a "negative value".

Although the image data DV is not updated in a sixteenth frame period, the polarity bias value Nb reaches "−7", which is the preset minimum value. Therefore, the periodical refreshment is performed in the sixteenth frame period. The polarity bias value Nb at this time is a "negative value", and accordingly, based on the polarity signal Spl, the direction of the polarity bias value Nb is changed to the direction in which the polarity bias value Nb approaches "0", that is, the direction in which the polarity bias value Nb is increased. Therefore, the periodical refreshment is performed by writing the data voltage in which the polarity is reversed to the positive polarity. Subsequently, also in the pause periods of seventeenth and eighteenth frame periods, the positive data voltage is held in the pixel capacitance Cp. In this manner, for each of the sixteenth frame period as the periodical refresh period and of the pause frame periods of the subsequent seventeenth and eighteenth frame periods, the polarity bias value Nb is incremented by "1", and the incremented polarity bias value Nb is stored each time in the balance counter 260. The polarity bias value Nb at the time when the eighteenth frame period is ended is "−4", which is a "negative value".

In a nineteenth frame period, the liquid crystal display device 100 is switched from the pause drive to the high frequency drive. The high frequency drive is performed by alternately writing the positive data voltage and the negative data voltage into the pixel capacitance Cp. However, the polarity bias value Nb in the eighteenth frame period is "−4", and accordingly, based on the polarity signal Spl, the direction in which the polarity bias value Nb approaches "0", that is, the direction in which the polarity bias value Nb is increased is maintained. Therefore, the positive data voltage is written. Next, the polarity bias value Nb in the nineteenth frame period is "−3", and accordingly, based on the polarity signal Spl, the direction in which the polarity bias value Nb approaches "0", that is, the direction in which the polarity bias value Nb is increased is maintained. Therefore, the positive data voltage is written. Similarly, until the polarity bias value Nb becomes "0", the positive data voltage is written into the pixel capacitance Cp every frame period. In this manner, the polarity bias value is incremented by "1", and becomes "0" in a twenty-second frame period. In the liquid crystal display device 100, when the polarity bias value Nb becomes "0", the polarity of the data voltage is reversed, and accordingly, the negative data voltage is written in a twenty-third frame period, and the polarity bias value becomes "−1". In a twenty-fourth frame period and thereafter, the polarity bias value Nb repeatedly becomes "0" and "−1" every frame period.

In FIG. 7, the description is made of the case where the liquid crystal display device 100 is switched from the pause drive to the high frequency drive when the polarity bias value Nb is a "negative value"; however, the same also applies to the case where the liquid crystal display device 100 is switched from the pause drive to the high frequency drive when the polarity bias value Nb is a "positive value". In this high frequency drive, unlike the above-mentioned case of the high frequency drive, the polarity bias value Nb repeats "+1" and "0" every frame period.

Figure 8:
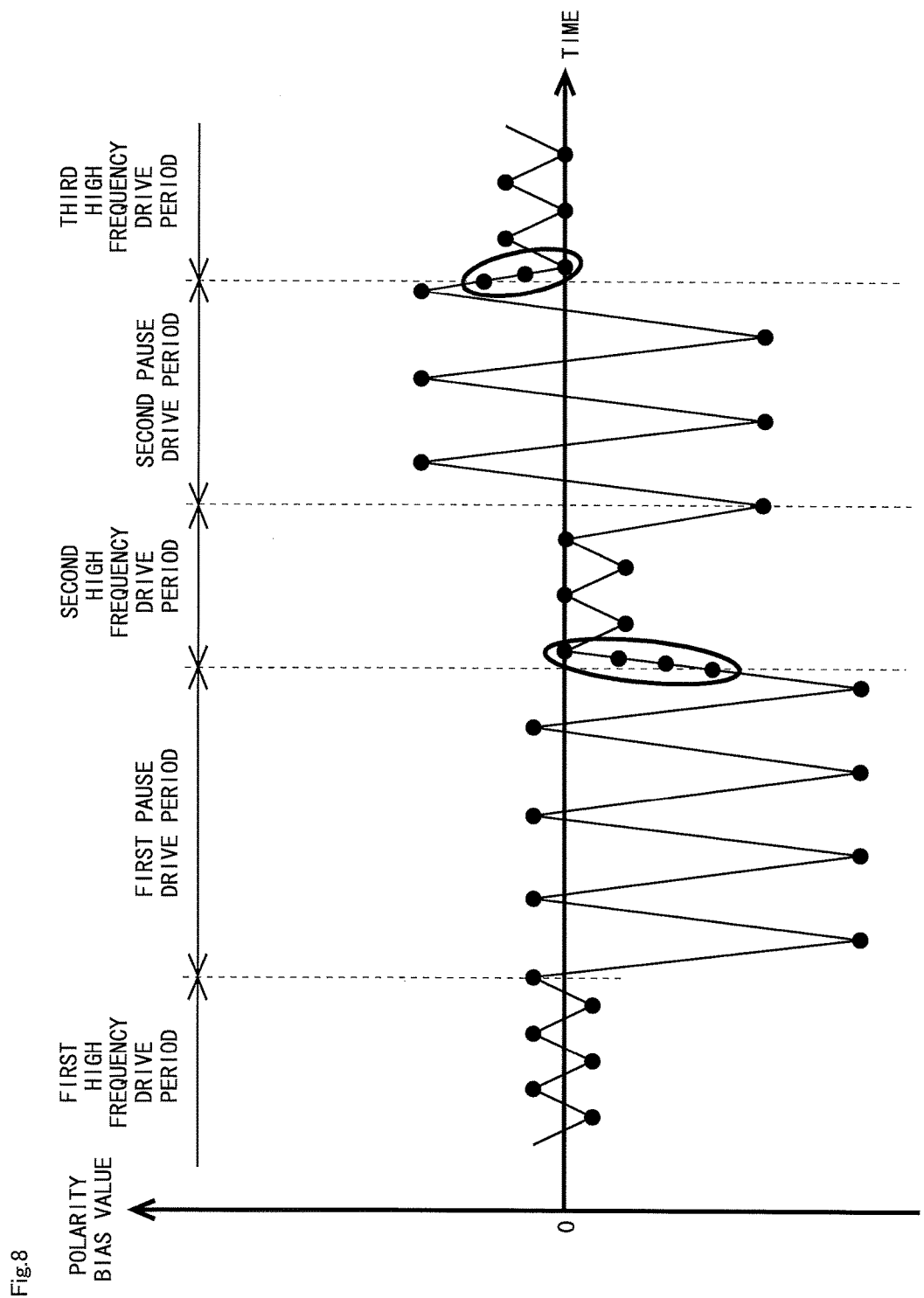
FIG. 8 is another chart showing the method for making the adjustment so that the polarity bias value Nb approaches "0" in the case of operating the liquid crystal display device of this embodiment while switching the same from the pause drive to the high frequency drive.

FIG. 8 is another chart showing the method for making the adjustment so that the polarity bias value Nb approaches "0" in the case of operating the liquid crystal display device 100 of this embodiment while switching the same from the pause drive to the high frequency drive. As shown in FIG. 8, when the drive period is switched from a first high frequency drive period to a first pause drive period, and further, the forced refresh signal Scrf and the image data DV for displaying the moving picture are given from the host 90 during the first pause drive period, the drive period is further switched from the first pause drive period to a second high frequency drive period.

In a usual high frequency drive period, positive refreshment that applies the positive data voltage and negative refreshment that applies the negative data voltage are alternately repeated. However, in the second high frequency drive period in this embodiment, in the case where the polarity bias value Nb when the drive period is switched from the first pause drive period to the second high frequency drive period is a negative value, the positive refreshment is repeated four times every refresh frame period so that the polarity bias value Nb is directed to "0", that is, a center in FIG. 8. These four refreshments are represented by four black circles in an ellipsoid shown in FIG. 8. When the polarity bias value Nb becomes "0" by the fourth refreshment, the polarity of the data voltage to be written into the pixel capacitance Cp is alternately reversed, whereby the negative refreshment and the positive refreshment are repeated alternately. In this manner, in the high frequency drive that follows, the polarity bias value repeats "0" and "−1" every frame period, and the polarity bias is substantially eliminated.

Moreover, when the drive period is switched from the second high frequency drive period to the second pause drive period, and is further switched to a third high frequency drive period when the polarity bias value Nb at the time of the pause drive is a positive value, the negative refreshment is repeated three times every refresh frame period so that the polarity bias value Nb is directed to "0", that is, the center in FIG. 8. These three refreshments are represented by three black circles in an ellipsoid shown in FIG. 8. When the polarity bias value Nb becomes "0" by the third refreshment, the polarity of the data voltage to be written into the pixel capacitance Cp is alternately reversed, whereby the positive refreshment and the negative refreshment are repeated alternately. In this manner, in the third high frequency drive which follows, the polarity bias value repeats "+1" and "0" every frame period, and the polarity bias is substantially eliminated.

Next, a description is made of a high frequency drive performed in a state where the charge storage due to the uneven distribution of the impurity ions 15, which include positive ions and negative ions, is eliminated by approximating the polarity bias value Nb to "0". FIGS. 9(A) and 9(B) are schematic views showing distributions of the impurity ions 15 in the liquid crystal layer of the pixel formation portion 10 in the high frequency drive, and more specifically, FIG. 9(A) is a schematic view showing a state in which the high frequency drive is performed in a state where the impurity ions 15 of the pixel formation portion 10 are unevenly distributed; and FIG. 9(B) is a schematic view showing a state in which the high frequency drive is performed in a state where the uneven distribution of the impurity ions 15 in the pixel formation portion 10 is eliminated. As shown in FIG. 9(A), even if the high frequency drive is performed in the state where the impurity ions 15 are unevenly distributed, the uneven distribution of the impurity ions 15 is not eliminated. In this case, the direct current voltage component generated by the uneven distribution of the impurity ions 15 is applied to the liquid crystal molecules, and accordingly, when the high frequency drive is performed, there occurs the display defect such as the flicker due to the deviation of the optimum common voltage and the afterimage due to the burn-in of the liquid crystal.

Accordingly, if the refreshment is performed during the pause drive, the polarity of the data voltage is controlled by the above-mentioned method so that the polarity bias value Nb approaches "0" in the refresh period and the subsequent pause periods, and the data voltage is applied. In this manner, as shown in FIG. 9(B), the high frequency drive is performed in the state where the uneven distribution of the impurity ions 15 is eliminated, and accordingly, the direct current voltage component is hardly applied to the liquid crystal molecules when the high frequency drive is performed. Therefore, when the high frequency drive is performed, the occurrence of the display defect such as the flicker and the afterimage can be suppressed.

As described above, in the case where the liquid crystal display device 100 shifts from the pause drive to the high frequency drive reversed therefrom, when the high frequency synchronizing signal generated in synchronization with the cycle of the high frequency drive is given to the display control unit 200, the timing control circuit 230 generates the refresh signal Sref in synchronization with the cycle of the high frequency drive. In this manner, the polarity reverse control circuit 270 also generates the polarity signal Spl in synchronization with the cycle of the high frequency drive, and accordingly, the polarity bias management circuit 250 controls the polarity bias value Nb in the direction in which the polarity bias value Nb approaches "0" in the case where the polarity bias value Nb is not "0", and controls the polarity bias value Nb in the direction in which the polarity bias value Nb is reversed in the case where the polarity bias value Nb is "0". Therefore, even in the case where the polarity bias value Nb at the time of the pause drive deviates from "0" to a large extent, the liquid crystal display device 100 shifts to the high frequency drive, whereby the polarity bias value Nb approaches "0" by "1" every frame period, and when the polarity bias value Nb becomes "0", the polarity bias value Nb alternately repeats "+1" and "0" or "0" and "−1". As a result, the polarity bias value Nb becomes substantially "0" in the high frequency drive, and accordingly, the occurrence of the flicker or the like is suppressed.

2.2 Effects

In accordance with this embodiment, in the case where the drive is switched from the pause drive to the high frequency drive, if the polarity bias value Nb is biased to the positive or negative side, the negative or positive data voltage is continuously applied every refresh frame period in the high frequency drive until the polarity bias value Nb becomes substantially "0". In this manner, the polarity bias value Nb becomes substantially "0", and accordingly, the high frequency drive is prevented from being performed in the state where the polarity bias value Nb deviates to a large extent, and the direct current voltage component is hardly applied to the liquid crystal layer. As a result, when the liquid crystal display device 100 operates according to the high frequency drive, the liquid crystal display device 100 can suppress the occurrence of the display defect, such as the flicker and the afterimage, which is caused by the application of the direct current voltage component to the liquid crystal layer.

Moreover, in the case where the drive is switched from the pause drive to the high frequency drive, if the polarity bias value Nb is biased to the positive or negative side, the polarity bias is controlled to be directed to "0", and accordingly, the polarity bias is often in the state of being approximated to "0" even if the power supply of the liquid crystal display device 100 is off when the liquid crystal display device 100 operates according to the high frequency drive. In this case, the direct current voltage is not continuously applied to the liquid crystal layer during the period in which the power supply is turned off, and accordingly, the occurrence of the display defect, such as the flicker and the afterimage, which is likely to occur when the power supply is turned on, is suppressed.

Moreover, in the case of performing the refreshment, the polarity bias value Nb is controlled to approach "0", and accordingly, the upper limit/lower limit management circuit for managing the polarity bias value Nb so that the polarity bias value Nb does not go beyond the upper limit value and the lower limit value becomes unnecessary. In this manner, manufacturing cost of the display control unit 200 can be reduced.

3. Third Embodiment

A configuration of the liquid crystal display device 100 according to the third embodiment is the same as the configuration of the liquid crystal display device 100 according to the first embodiment, and accordingly, a block diagram of the liquid crystal display device 100 of this embodiment and the description thereof are omitted.

Moreover, an arrangement of constituents of a display control unit 200 included in the liquid crystal display device 100 is the same as the arrangement of the constituents shown in FIG. 5. However, signals are partially different from those in FIG. 5; and accordingly, those different signals are described. In FIG. 5, in the case where the image is updated by the forced refreshment, the forced refresh signal Scrf is given from the host 90 to the timing control circuit; however, in this embodiment, an off-sequence signal that is an alternating current voltage having a predetermined frequency is given. When the off-sequence signal is given, the timing control circuit 230 generates the refresh signal Sref, and gives the generated refresh signal Sref to the polarity bias management circuit 250 and the polarity reverse control circuit 270. Moreover, in FIG. 5, the image data DV is given from the host 90 to the frame memory 210; however, in this embodiment, erase data for erasing the image data stored in the pixel formation portion 10 is given. Note that operations of the display control unit 200, which follow, are the same as the operations of the display control unit 200 shown in FIG. 5, and accordingly, the description thereof is omitted.

In this embodiment, when the pause drive is performed in the case of the first or second embodiment, if an OFF signal is given from the host 90, the liquid crystal display device 100 shifts to an off-sequence. If a period of this off-sequence can be shortened, it becomes easier to use the liquid crystal display device 100. In this connection, first, a conventional off-sequence is described as a reference example, and next, a description is made of the way of solving a problem, which is caused by the conventional off-sequence, by this embodiment.

3.1 Operation at Time of Off-Sequence

Figure 10:
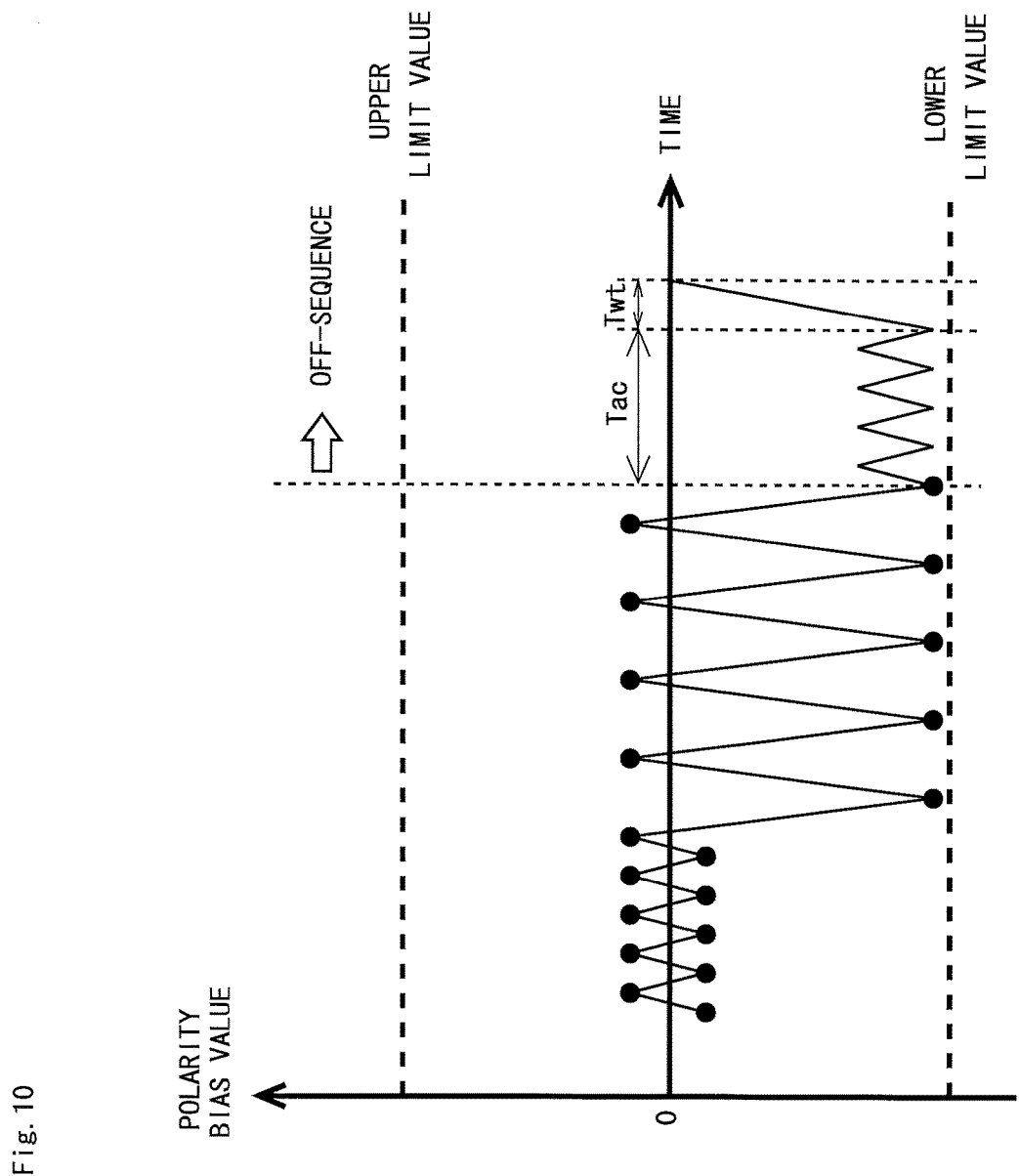
FIG. 10 is a chart showing, as a reference example, an operation of a liquid crystal display device at the time of a conventional off-sequence.

A description is made of an operation of a liquid crystal display device at the time of the conventional off-sequence, the operation serving as the reference example. FIG. 10 is a chart showing, as the reference example, the operation of the liquid crystal display device at the time of the conventional off-sequence. As shown in FIG. 10, when the polarity bias value Nb is a value approximate to the lower limit value in the pause drive, if the OFF signal is given to the liquid crystal display device from the host 90, the liquid crystal display device discontinues the pause drive, and shifts to the off-sequence. If the liquid crystal display device shifts to the off-sequence, the off-sequence signal, which is an alternating current voltage, is given to the liquid crystal display device from the host 90 for a predetermined time Tac. This off-sequence signal is applied to each pixel formation portion 10, whereby the charges stored in the pixel capacitance Cp when the power supply is off is discharged, and an image displayed on the display unit 500 until immediately before the OFF signal is given is erased. At this time, even if the polarity bias value Nb when the off-sequence signal is given is biased to either the positive side or the negative side to a large extent, the positive voltage and the negative voltage are applied alternately, and accordingly, the polarity bias value Nb immediately before the off-sequence signal is given is not changed to a large extent.

Next, after the predetermined time Tac for applying the off-sequence signal has elapsed, the polarity bias value Nb is further approximated to "0" gradually in order to set the polarity bias value Nb to "0". This time for setting the polarity bias value Nb to "0" is referred to as a wait time Twt. As described above, in the case of the reference example, a time of the off-sequence includes not only the predetermined time Tac for applying the off-sequence signal but also the wait time Twt, and accordingly, there is a problem that such an off-sequence time is elongated.

Figure 11:
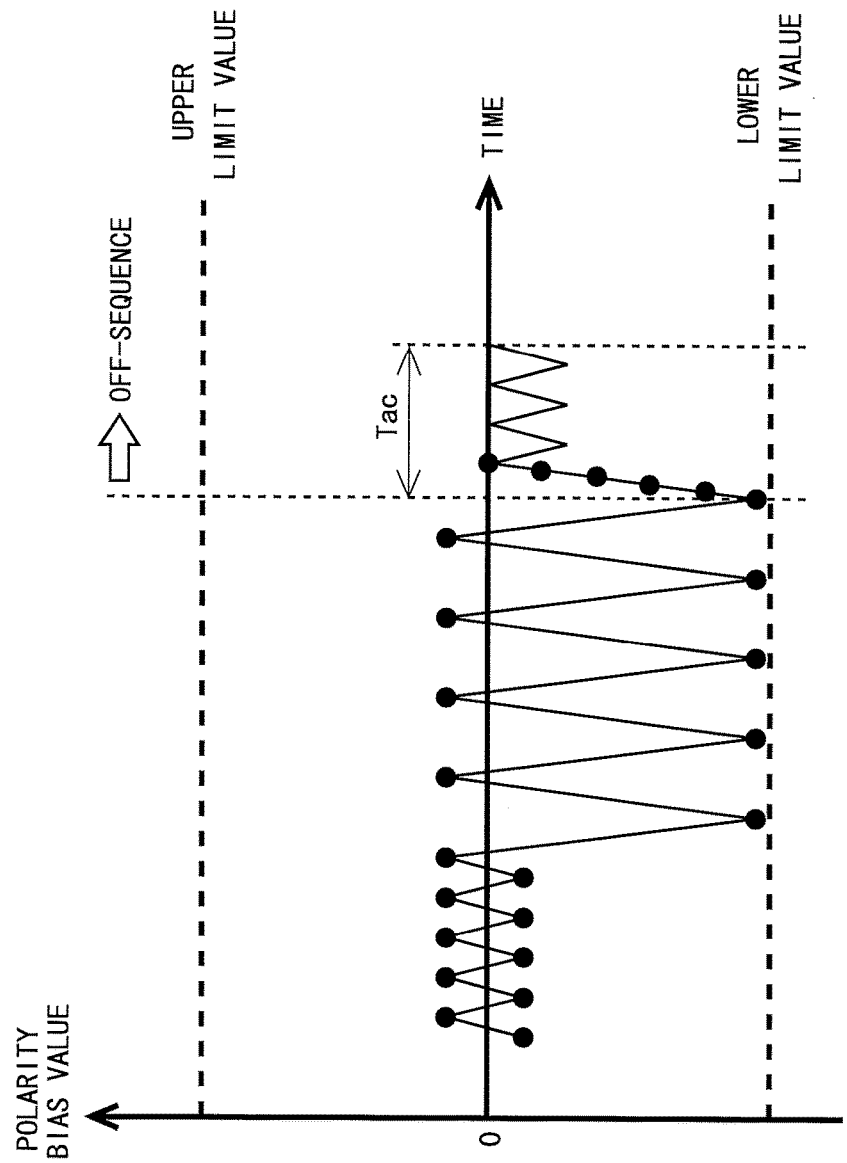
FIG. 11 is a chart showing an operation at the time of an off-sequence in the liquid crystal display device according to this embodiment.

Next, a description is made of the operation of the off-sequence of the liquid crystal display device 100 according to this embodiment. FIG. 11 is a chart showing the operation at the time of the off-sequence in the liquid crystal display device 100 according to this embodiment. As shown in FIG. 11, if the OFF signal is given to the liquid crystal display device 100 from the host 90 when the polarity bias value Nb is not "0", for example, a value approximate to the lower limit value in the pause drive, the liquid crystal display device 100 discontinues the pause drive, and shifts to the off-sequence. If the liquid crystal display device 100 shifts to the off-sequence, the off-sequence signal, which is an alternating current voltage, is given to the liquid crystal display device 100 from the host 90 for a predetermined time Tac, and an alternating current drive is performed. This predetermined time is the same as the predetermined time Tac in the above-described reference example. As shown in FIG. 11, in a case where the polarity bias value Nb when the liquid crystal display device 100 shifts to the off-sequence is a value approximate to the lower limit value, the positive voltage is applied every cycle at the time of the off-sequence similarly to when the drive is switched from the pause drive to the high frequency drive in the second embodiment. In this manner, the polarity bias value Nb approaches "0" by "1" every frame period, and becomes "0" in a fifth cycle. In this manner, not only the image displayed until immediately before the OFF signal is given is erased within the predetermined time Tac, but also the polarity bias is eliminated, and the polarity bias value Nb becomes "0". Moreover, in a case where a period required until an average value of the polarity bias value Nb is set to "0" is shorter than the predetermined time Tac for applying the alternating current voltage, the positive refreshment and the negative refreshment are repeated alternately in the residual time, and the off-sequence is ended when the predetermined time Tac has elapsed. In this case, the polarity bias value Nb repeats "0" and "−1", and accordingly, the average value of the polarity bias value Nb within the predetermined time Tac becomes substantially "0".

As described above, the polarity reverse control circuit 270 generates the polarity signal Spl every time the polarity of the off-sequence signal given from the host 90 is changed, and accordingly, even if the polarity bias value Nb immediately before the off-sequence signal is inputted deviates from "0" to a large extent, if the off-sequence period still remains when the polarity bias value Nb approaches "0" by "1" every frame period and then becomes "0", the polarity bias value Nb alternately repeats "0" and "+1" or "0" and "−1" in the residual period. As a result, the polarity bias value Nb becomes substantially "0" before the operation of the liquid crystal display device 100 is stopped, and accordingly, the occurrence of the flicker and the like is suppressed when the power supply is turned on again. Moreover, the wait time Twt heretofore required until the polarity bias value Nb is set to "0" becomes unnecessary.

3.2 Effects

In accordance with the liquid crystal display device 100 according to this embodiment, in the off-sequence period, not only the image displayed until immediately before the OFF signal is given is erased, but also the polarity bias is eliminated, and accordingly, the wait time Twt required in the conventional off-sequence becomes unnecessary, and the time required for the off-sequence can be shortened. In this manner, the liquid crystal display device 100 can be used more easily.

4. Others

A drive method of reversing the polarity of the data voltage includes drive methods such as dot reverse, line reverse, column reverse, and frame reverse; however, the present invention is applicable to any drive method.

Moreover, in the above-described embodiment, the description is made that the polarity bias value Nb is incremented and decremented by "1" every frame period that serves as the pause frame period or the refresh frame period. That is, it is described that the polarity bias value Nb that indicates the polarity bias is managed by using one frame period as a unit. However, the polarity bias value Nb may be managed by using two frame periods, three frame periods or the like as a unit, and moreover, may be managed in a time unit other than the frame period. Accordingly, in this specification, these may be collectively referred to as a "period unit".

Moreover, in the above-described embodiment, the description is made that the forced refreshment is performed when a new image is inputted. However, also in a case of switching on/off the display of the display unit 500 or reversing the image displayed on the display unit 500 horizontally or vertically, for example, by the command given from the host 90, the adjustment is made so that the polarity bias value Nb approaches "0" similarly to the forced refreshment, whereby a similar effect is obtained.

Moreover, in the high frequency drive in each of the above-described embodiments, the description is made that the polarity is reversed every frame period. However, the high frequency drive of the present invention also includes a case where the polarity is reversed for every two frame periods or for every three frame periods, and the high frequency drive only needs to be sufficiently fast as compared to the refresh period of the pause drive.

INDUSTRIAL APPLICABILITY

The present invention is suitable for a liquid crystal display device and a method for driving the same. In particular, the present invention is suitable for a liquid crystal display device that suppresses the occurrence of the flicker or the after image, and for a method for driving the same.

DESCRIPTION OF REFERENCE CHARACTERS

10: PIXEL FORMATION PORTION
11: THIN FILM TRANSISTOR (TFT)

100: LIQUID CRYSTAL DISPLAY DEVICE
200: DISPLAY CONTROL UNIT
210: FRAME MEMORY
220: SELECTOR
230: TIMING CONTROL CIRCUIT
240: NREF COUNTER
250: POLARITY MANAGEMENT CIRCUIT
270: POLARITY REVERSE CONTROL CIRCUIT
300: DRIVE UNIT
310: SOURCE DRIVER
320: GATE DRIVER
400: GAMMA UNIT
410: POSITIVE GAMMA CIRCUIT
420: NEGATIVE GAMMA CIRCUIT
500: DISPLAY UNIT
Cp: PIXEL CAPACITANCE
Nb: POLARITY BIAS VALUE
Nc: NREF COUNT VALUE
Sref: REFRESH SIGNAL
Scrf: FORCED REFRESH SIGNAL
Spl: POLARITY SIGNAL
Srd: READOUT SIGNAL
Vsync: VERTICAL SYNCHRONIZING SIGNAL

The invention claimed is:

1. A liquid crystal display device that displays an image represented by inputted image data on a display unit by applying a data voltage corresponding to the image data to a liquid crystal layer of the display unit, the liquid crystal display device comprising:
a drive unit configured to apply the data voltage to the liquid crystal layer; and
a display control unit configured to manage a polarity bias of the data voltage in a predetermined period unit, and to control the drive unit in a direction in which the polarity bias of the data voltage is eliminated in a frame period for updating the image displayed on the display unit, wherein
the display unit includes a plurality of pixel formation portions that hold the data voltage;
in order to eliminate the polarity bias in the frame period for updating the image, the display control unit specifies a direction in which a polarity bias value representing the polarity bias is changed, and controls the drive unit to apply the data voltage to each of the plurality of pixel formation portions, the data voltage having the polarity bias value changed in the specified direction for each of the frame period for updating the image and of frame periods subsequent to the frame period,
the display control unit includes:
a polarity bias management circuit that obtains and manages the polarity bias value in the predetermined period unit;
a polarity reverse control circuit that generates a polarity signal that controls the polarity bias value in a direction in which the polarity bias value approaches "0" in a case where the polarity bias value outputted from the polarity bias management circuit is not "0" in the frame period for updating the image, and controls the polarity bias value in a direction in which the polarity bias value is reversed in a case where the polarity bias value is "0" in the frame period;
a timing control circuit that generates, at predetermined timing, a refresh signal indicating that the frame period is the frame period for updating the image, and to give the generated refresh signal to the polarity bias management circuit and the polarity reverse control circuit; and
an NREF counter that counts a number of pause frame periods,
the polarity bias management circuit increases or decreases the polarity bias value by "1" in the direction specified by the polarity signal given from the polarity reverse control circuit,
when an off-sequence signal that is an alternating current voltage having a predetermined frequency and erase data for erasing the data voltage written into the pixel formation portions are given to the display control unit in a case of stopping an operation of the liquid crystal display device,
the timing control circuit generates the refresh signal based on the off-sequence signal and outputs the generated refresh signal to the polarity bias management circuit and the polarity reverse control circuit,
the polarity bias management circuit increases or decreases the polarity bias value by "1" in the direction specified by the polarity signal every time a polarity of the off-sequence signal is changed, and
the erase data is given to the drive unit.

2. The liquid crystal display device according to claim 1, wherein the polarity bias management circuit includes a balance counter configured to count and hold the polarity bias value, and every time a vertical synchronizing signal used for displaying the image represented by the image data on the display unit is given, the polarity bias management circuit increases or decreases the polarity bias value held in the balance counter by "1" in the direction specified by the polarity signal.

3. The liquid crystal display device according to claim 1, wherein the timing control circuit generates and outputs the refresh signal when a count value of the NREF counter reaches a predetermined number.

4. The liquid crystal display device according to claim 3, wherein the timing control circuit resets the NREF counter in a case of generating and outputting the refresh signal.

5. The liquid crystal display device according to claim 1, wherein a forced refresh signal for displaying a new image on the display unit is given to the display control unit together with image data for displaying the new image, the timing control circuit generates and outputs the refresh signal based on the forced refresh signal.

6. The liquid crystal display device according to claim 1, wherein, when a command to horizontally or vertically reverse the image displayed on the display unit is given, the timing control circuit generates and outputs the refresh signal based on the command.

7. The liquid crystal display device according to claim 1, wherein
when a high frequency synchronizing signal generated in synchronization with a cycle of a high frequency drive is given in a case where the liquid crystal display device shifts from a pause drive to a high frequency drive, the timing control circuit generates the refresh signal based on the high frequency synchronizing signal and outputs the generated refresh signal to the polarity bias management circuit and the polarity reverse control circuit, and
every time the high frequency synchronizing signal is given, the polarity bias management circuit increases or decreases the polarity bias value by "1" in the direction specified by the polarity signal.

8. The liquid crystal display device according to claim 1, further comprising:

a positive gamma circuit configured to generate positive data voltage based on the image data and a negative gamma circuit configured to generate negative data voltage based on the image data, wherein the display control unit further includes a selector configured to select one of the positive gamma circuit and the negative gamma circuit based on the polarity signal, and the selector selects one of the positive gamma circuit and the negative gamma circuit and gives the image data based on the polarity signal given from the polarity reverse control circuit.

9. The liquid crystal display device according to claim 1, further comprising:

a frame memory configured to store the inputted image data, wherein the timing control circuit gives a readout signal for reading out the image data to the frame memory at a same time of outputting the refresh signal, and the frame memory outputs the stored image data when the readout signal is given.

10. The liquid crystal display device according to claim 1, further comprising:

data signal lines and scanning signal lines, both of which are configured to connect the pixel formation portions and the drive unit and are formed in the display unit, wherein each of the pixel formation portions includes:

a pixel capacitance configured to hold the data voltage; and a switching element having a control terminal connected to the scanning signal line, a first conduction terminal connected to the data signal line, and a second conduction terminal connected to the pixel capacitance, and the switching element includes a thin film transistor having a channel layer formed of an oxide semiconductor.

11. The liquid crystal display device according to claim 10, wherein the oxide semiconductor contains indium gallium zinc oxide.

* * * * *